(12) United States Patent
Crockett et al.

(10) Patent No.: US 8,984,501 B2
(45) Date of Patent: Mar. 17, 2015

(54) HIERARCHY AND PROCESSING ORDER CONTROL OF DOWNLOADABLE AND UPGRADEABLE MEDIA PROCESSING APPLICATIONS

(75) Inventors: Brett G. Crockett, San Francisco, CA (US); Charles P. Brown, San Francisco, CA (US); Alan J. Seefeldt, San Francisco, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 410 days.

(21) Appl. No.: 13/377,475

(22) PCT Filed: Jun. 17, 2010

(86) PCT No.: PCT/US2010/039054
§ 371 (c)(1),
(2), (4) Date: Dec. 9, 2011

(87) PCT Pub. No.: WO2010/148239
PCT Pub. Date: Dec. 23, 2010

(65) Prior Publication Data
US 2012/0092555 A1  Apr. 19, 2012

Related U.S. Application Data

(60) Provisional application No. 61/218,759, filed on Jun. 19, 2009.

(51) Int. Cl.
*G06F 9/44* (2006.01)
*G10H 1/00* (2006.01)
(Continued)

(52) U.S. Cl.
CPC ........... *G10H 1/0091* (2013.01); *H04N 5/4403* (2013.01); *G06F 8/71* (2013.01);
(Continued)

(58) Field of Classification Search
None
See application file for complete search history.

(56) References Cited

U.S. PATENT DOCUMENTS 5,657,222 A  8/1997 Randolph
5,722,041 A  2/1998 Freadman
(Continued)

FOREIGN PATENT DOCUMENTS

CN  1387343 A  12/2002
CN  1589588 A  3/2005
(Continued)

OTHER PUBLICATIONS

Lartillot et al., "A Matlab Toolbox for Musical Feature Extraction From Audio," 2007, Proc. of the 10th Int. Conference on Digital Audio Effects (DAFx-07), Bordeaux, France, pp. 1-8.*
(Continued)

*Primary Examiner* — Thuy Dao
*Assistant Examiner* — Stephen Berman
(74) *Attorney, Agent, or Firm* — Fish & Richardson P.C.

(57) ABSTRACT

A method for an audio/video (A/V) system includes accessing processing modules for downloadable applications. Each downloadable application can have at least one processing module and data for a graphical user interface (GUI), and each processing module can be configured to interact with an upgradable engine to adjust a performance or a setting of an audio and video (A/V) equipment. The method includes arranging an order of two or more of the processing modules in a processing chain to share processing resources, to reduce a processing requirement of the A/V equipment, or to enhance a level of performance of the A/V equipment.

20 Claims, 14 Drawing Sheets

(51) Int. Cl.

| | |
|---|---|
| *H04N 5/44* | (2011.01) |
| *G06F 9/48* | (2006.01) |
| *H04R 5/04* | (2006.01) |
| *H04N 21/422* | (2011.01) |
| *H04N 21/435* | (2011.01) |
| *H04N 21/436* | (2011.01) |
| *H04N 21/443* | (2011.01) |
| *H04N 21/45* | (2011.01) |
| *H04N 21/462* | (2011.01) |
| *H04N 21/658* | (2011.01) |
| *H04N 21/81* | (2011.01) |
| *G06F 9/445* | (2006.01) |
| *H04S 7/00* | (2006.01) |
| *H04N 21/478* | (2011.01) |

(52) U.S. Cl.
CPC .............. *G06F 8/65* (2013.01); *G06F 9/4881* (2013.01); *G10H 2230/041* (2013.01); *H04R 5/04* (2013.01); *H04S 7/30* (2013.01); *H04S 7/301* (2013.01); *H04S 7/307* (2013.01); *H04S 7/308* (2013.01); *G06F 2209/482* (2013.01); *G06F 2209/484* (2013.01); *H04N 21/42202* (2013.01); *H04N 21/435* (2013.01); *H04N 21/43615* (2013.01); *H04N 21/4431* (2013.01); *H04N 21/4516* (2013.01); *H04N 21/4532* (2013.01); *H04N 21/4622* (2013.01); *H04N 21/47815* (2013.01); *H04N 21/6582* (2013.01); *H04N 21/8166* (2013.01)
USPC ........................................................ 717/168

(56) References Cited

U.S. PATENT DOCUMENTS

| | | | | |
|---|---|---|---|---|
| 5,913,038 | A | 6/1999 | Griffiths | |
| 6,021,276 | A * | 2/2000 | Demke et al. | 717/178 |
| 6,052,750 | A | 4/2000 | Lea | |
| 6,157,377 | A | 12/2000 | Shah et al. | |
| 6,182,045 | B1 | 1/2001 | Kredo et al. | |
| 6,507,953 | B1 | 1/2003 | Horlander et al. | |
| 6,944,474 | B2 | 9/2005 | Rader | |
| 7,093,272 | B1 | 8/2006 | Shah et al. | |
| 7,158,843 | B2 | 1/2007 | Smith | |
| 7,171,606 | B2 | 1/2007 | Blackburn et al. | |
| 7,237,032 | B2 | 6/2007 | Gemmell | |
| 7,293,169 | B1 | 11/2007 | Righi et al. | |
| 7,324,504 | B2 | 1/2008 | Park | |
| 7,346,912 | B2 | 3/2008 | Seebaldt | |
| 7,444,635 | B2 * | 10/2008 | Lehtinen | 718/104 |
| 7,512,698 | B1 * | 3/2009 | Pawson | 709/231 |
| 7,529,545 | B2 | 5/2009 | Rader | |
| 7,596,788 | B1 * | 9/2009 | Shpigelman | 718/100 |
| 7,647,127 | B2 | 1/2010 | Takemura et al. | |
| 8,695,004 | B2 * | 4/2014 | Kaiser et al. | 718/103 |
| 2002/0029148 | A1 | 3/2002 | Okayama | |
| 2002/0065568 | A1 * | 5/2002 | Silfvast et al. | 700/94 |
| 2002/0087530 | A1 | 7/2002 | Smith et al. | |
| 2002/0116548 | A1 * | 8/2002 | Feist | 709/330 |
| 2003/0064746 | A1 | 4/2003 | Rader | |
| 2003/0066091 | A1 | 4/2003 | Lord et al. | |
| 2003/0112264 | A1 | 6/2003 | Duguid et al. | |
| 2004/0150663 | A1 | 8/2004 | Kim | |
| 2005/0060229 | A1 | 3/2005 | Riedl et al. | |
| 2005/0060742 | A1 | 3/2005 | Riedl et al. | |
| 2005/0060745 | A1 | 3/2005 | Riedl et al. | |
| 2005/0172319 | A1 | 8/2005 | Reichardt | |
| 2005/0182633 | A1 | 8/2005 | Takemura et al. | |
| 2005/0260978 | A1 * | 11/2005 | Rader et al. | 455/418 |
| 2005/0260985 | A1 | 11/2005 | Rader | |
| 2006/0005221 | A1 | 1/2006 | MacBeth | |
| 2006/0010111 | A1 | 1/2006 | Jones et al. | |
| 2006/0029239 | A1 | 2/2006 | Smithers | |
| 2006/0117346 | A1 | 6/2006 | Jo et al. | |
| 2006/0174306 | A1 | 8/2006 | Kim et al. | |
| 2006/0288300 | A1 | 12/2006 | Chambers et al. | |
| 2007/0005334 | A1 * | 1/2007 | Salmonsen | 703/26 |
| 2007/0006081 | A1 | 1/2007 | Maehata et al. | |
| 2007/0006210 | A1 | 1/2007 | Shin et al. | |
| 2007/0026946 | A1 | 2/2007 | Newborn | |
| 2007/0082661 | A1 | 4/2007 | Black | |
| 2007/0113231 | A1 * | 5/2007 | Honmura | 718/100 |
| 2007/0192462 | A1 | 8/2007 | Bae et al. | |
| 2007/0261028 | A1 * | 11/2007 | Schenk et al. | 717/121 |
| 2007/0291959 | A1 | 12/2007 | Seefeldt | |
| 2007/0297755 | A1 | 12/2007 | Holt et al. | |
| 2008/0046881 | A1 * | 2/2008 | Braghiroli | 717/173 |
| 2008/0059400 | A1 | 3/2008 | Fernandez | |
| 2008/0120347 | A1 | 5/2008 | Jupin | |
| 2008/0172701 | A1 | 7/2008 | Montazemi | |
| 2008/0195997 | A1 | 8/2008 | Herberger et al. | |
| 2008/0216129 | A1 * | 9/2008 | Chaney | 725/74 |
| 2009/0097676 | A1 | 4/2009 | Seefeldt | |
| 2009/0125896 | A1 * | 5/2009 | Chessell et al. | 717/168 |
| 2009/0193137 | A1 * | 7/2009 | Pawson | 709/231 |
| 2009/0228876 | A1 | 9/2009 | Chen et al. | |
| 2010/0027812 | A1 | 2/2010 | Moon | |
| 2010/0106944 | A1 * | 4/2010 | Symes et al. | 712/208 |
| 2011/0126200 | A1 * | 5/2011 | Krieger et al. | 718/102 |

FOREIGN PATENT DOCUMENTS

| | | |
|---|---|---|
| CN | 1734419 A | 2/2006 |
| EP | 1168883 A2 | 1/2002 |
| EP | 1742352 A2 | 1/2007 |
| EP | 1760921 A2 | 3/2007 |
| EP | 1 816 892 A1 | 8/2007 |
| EP | 1816892 A1 | 8/2007 |
| GB | 2377574 A | 1/2003 |
| JP | 10285569 A | 10/1998 |
| JP | 11102297 A | 4/1999 |
| KR | 2006093430 A | 8/2006 |
| KR | 2007046500 A | 5/2007 |
| KR | 2007076682 A | 7/2007 |
| WO | WO02088993 A1 | 11/2002 |
| WO | WO03026349 A1 | 3/2003 |
| WO | WO2008033450 A2 | 3/2008 |
| WO | WO2008037344 A2 | 4/2008 |
| WO | 2009012533 A1 | 1/2009 |
| WO | WO2009012533 A1 | 1/2009 |
| WO | WO2010148244 A1 | 12/2010 |

OTHER PUBLICATIONS

Chaudhary et al., "An Open Architecture for Real-Time Audio Processing Software," 1999, Proceedings of the Audio Engineering Society 107th Convention, pp. 1-34.*
Jot, "Real-time spatial processing of sounds for music, multimedia and interactive human-computer interfaces," 1999, Multimedia Systems 7: 55-69 (1999), pp. 55-69.*
Authorized Officer Markus Fruhmann, International Search Report and Written Opinion in PCT/US2010/039054, mailed Sep. 27, 2010; 12 pages.
Authorized Officer Markus Fruhmann, PCT International Preliminary Report on Patentability in PCT/US2010/039033, mailed Oct. 18, 2011; 19 pages.
Authorized Officer Rosa Poquet, International Search Report and Written Opinion in PCT/US2010/039033, mailed Sep. 27, 2010; 14 pages.
Authorized Officer Rosa Poquet, International Search Report and Written Opinion in PCT/US2010/039063, mailed Sep. 27, 2010; 15 pages.
Authorized Officer Markus Fruhmann, PCT International Preliminary Report on Patentability in PCT/US2010/039063, mailed Oct. 17, 2011; 20 pages.
Vidavic, et al., "Consolidated Data Acquisition and Management for First Responders" Institution of Electrical Engineers, vol. 26, No. 2, 2006, pp. 127-136.
Mas Ribes, et al., "A Fully Configurable Secure Environment for Multimetida Applications" Multimedia Applications, Services and Tecniques, 1997 vol. 1242/1997, 437-455.

(56) References Cited

OTHER PUBLICATIONS

Easwar, et al., "Multimedia System on a Chip for Set-Top Box Applications" Institution of Electrical Engineers, published in 1999.

Kon'ya, et al., "Metadata Generation and Distribution for Live Programs on Broadcasting-Telecommunication Linkage Services", Advances in Multimedia Information Processing, lectures notes in Computer Science, 2005, vol. 3767/2005, 224-233.

Jaffri, et al., "Efficient Delivery of Software Updates Using Advanced Compression Techniques" Software Maintenance 2006, ICSM 22nd IEEE International Conference, pp. 267-268.

Curtis, et al., "Multimedia Content Management-Provision of Validation and Personalisation Services" vol. 2, pp. 302-306, Multimedia Computing and Systems, 1999.

Krishnaswamy, et al., "Distributed Object Implementations for Interactive Applications" Middleware 2000: New York, Apr. 4-7, 2000.

Authorized Officer Markus Fruhmann, International Search Report and Written Opinion in PCT/US2010/039054, mailed Sep. 27, 2010; 14 pages.

Authorized Officer Markus Fruhmann, PCT International Preliminary Report on Patentability in PCT/US2010/039054, mailed Oct. 17, 2011; 17 pages.

Office Action issued in Chinese Application No. 201080027046.2 on Dec. 4, 2013, includes English Translation, 24 pages.

Office Action issued in Chinese Application No. 201080027046.2 on Aug. 4, 2014, includes English Translation, 21 pages.

Office Action issued in U.S. Appl. No. 13/377,452, on Apr. 24, 2014, 65 pages.

Notice of Allowance issued in U.S. Appl. No. 13/377,452 on Aug. 12, 2014, 13 pages.

\* cited by examiner

HIERARCHY AND PROCESSING ORDER CONTROL OF DOWNLOADABLE AND UPGRADEABLE MEDIA PROCESSING APPLICATIONS

CROSS REFERENCE TO RELATED APPLICATIONS

This utility application claims the benefit of priority to a U.S. Provisional Application for U.S. Patent Application Ser. No. 61/218,759, titled "UPGRADABLE ENGINE FRAMEWORK FOR AUDIO AND VIDEO," filed on Jun. 19, 2009, the contents of which are incorporated by reference in their entirety.

TECHNICAL FIELD

This disclosure relates generally to audio and video technology.

BACKGROUND

Video displays, such as CRTs, LCDs, plasma displays, and projectors may be manufactured and shipped with technology for processing video and handling audio. In a home theater environment, video displays may be accompanied by other components. Some components can include video playback devices, such as disc players (hard drive disc players, Blu-ray disc players). Home theater systems also can include a variety of types of speakers, such as compact speakers (e.g., bookshelf speakers) or floor-standing speakers (e.g., tower speakers, full-range speakers). Other components may include audio-video receivers, which receive a signal (e.g., from the a disc player) and sends it to the speakers and/or the video display.

BRIEF DESCRIPTION OF DRAWINGS

Like reference numbers and designations in the various drawings can indicate like elements.

DESCRIPTION OF EXAMPLE EMBODIMENTS

Figure 1:
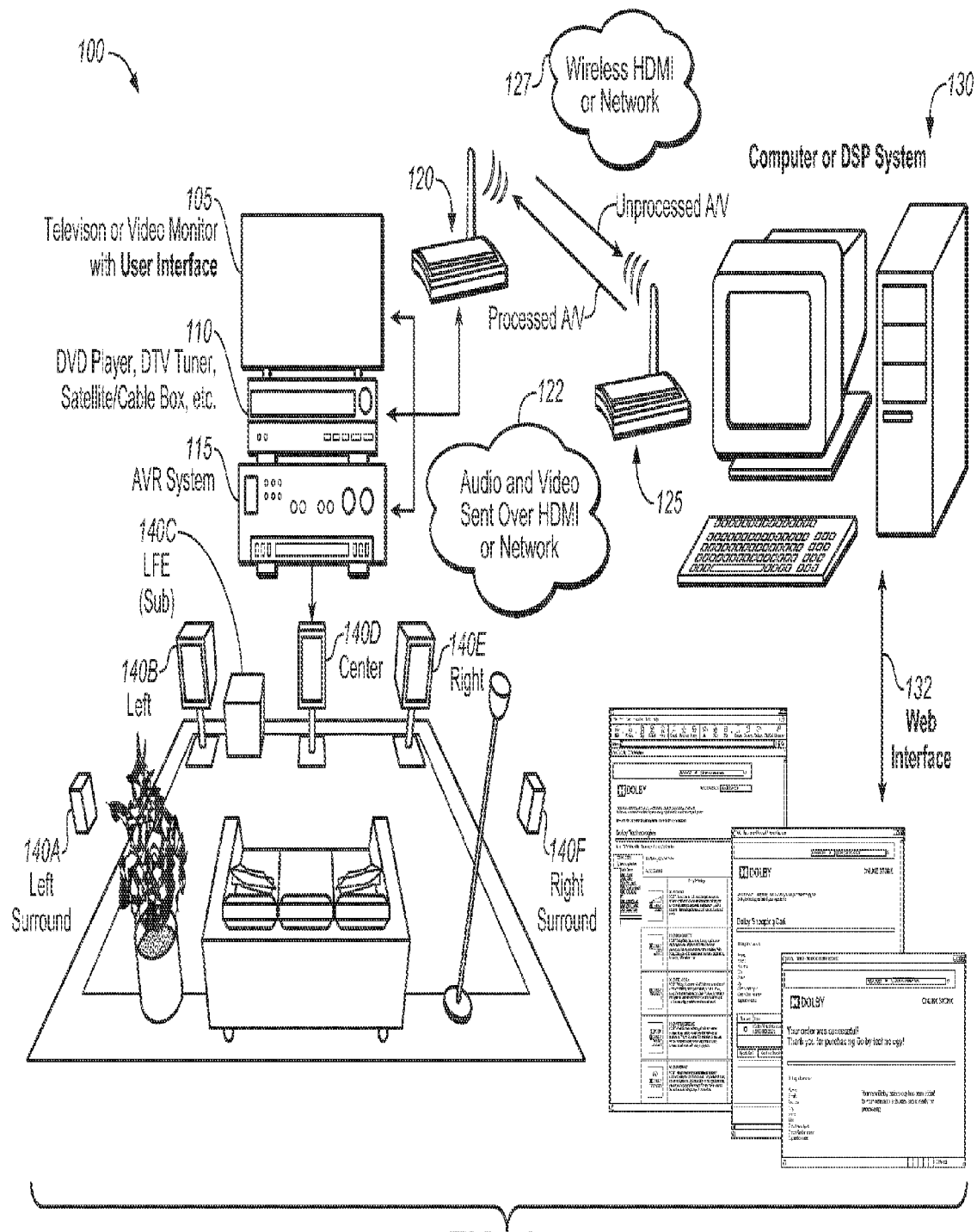
FIG. 1 depicts a diagram of an example of a home theater system with an upgradeable audio and/or video processing engine.

Example embodiments relating to upgradable audio and video applications are described herein. In the following description, for the purposes of explanation, numerous specific details are set forth in order to provide a thorough understanding of various embodiments. It will be apparent, however, that these embodiments may be practiced without these specific details. In other instances, structures and devices are shown in block diagram form in order to avoid unnecessarily obscuring other features. The details of one or more embodiments are set forth in the accompanying drawings and the description below. Other features, objects, and aspects are apparent from the description and drawings, and from the claims.

Overview

Some embodiments of the disclosed techniques involve an audio/video (A/V) system including: an audio/video (A/V) component configured to generate audio or video data; one or more processing devices configured to implement: an audio or video processing engine configured to process the audio or video data to generate one or more different domain representations of the audio or video data; and one or more audio or video processing applications that are each configured to access one or more of the different domain representations of the audio or video data and to perform audio or video processing on the one or more accessed domain representations of the audio or video data. Each of the one or more processing applications access and process the domain representations independently of each other.

These and other embodiments can optionally include one or more of the following features. The one or more processing devices can be configured to download the one or more applications from a server. The one or more processing devices can be configured to present an interface for a user to select one or more of the applications for downloading. The one or more processing devices can be configured to present an interface to an A/V user of the A/V component, in which the interface can be configured to allow the A/V user to control settings for the one or more audio or video processing applications. The interface can include one or more panels for each audio or video processing application. The one or more panels can allow at least one of following functions: a first panel to activate or de-active the application; a second panel to provide a description of the application to the A/V user; and a third panel to present the settings to the A/V user. Each audio or video processing application can include a processing module to interact with the audio or video processing engine, and application data for the interface for presentation of control and description information for the application on the one or more panels. The interface can be overlayed over at least an image of video content that is playing or playable in a background. The A/V system can include a router coupled to the A/V component. The router can include one or more of the processing devices. A computer can be coupled to the router and the computer can include one or more of the processing devices. The A/V component can include one or more of the processing devices. The A/V component can include a video display, a digital video player, a television tuner, an audio-video receiver (AVR) system, a satellite receiver, and/or a cable television box. The domain representations can include a frequency domain and a perceptual domain.

In other general aspects, techniques involve a method comprising: executing an audio or video processing engine configured to process audio or video data to generate one or more different domain representations of the audio or video data; and executing one or more audio or video processing applications configured to access one or more of the different domain representations of the audio or video data and to perform audio or video processing on the one or more accessed domain representations of the audio or video data.

These and other embodiments can optionally include one or more of the following features. The method can include downloading one of the audio or video processing applications from an application developer using a user account, in which each downloadable audio or video processing application can include data for a graphical user interface (GUI) for presentation on an A/V component. The method can include installing the downloaded audio or video processing application to be used with the engine. The method can include: using the GUI to receive a user input to adjust the performance of the A/V component; and in response to the user input, adjusting the performance of the A/V component; and presenting a representation of the adjustment to the performance of the A/V component in the GUI. The audio or video processing application can include a processing module. The method may involve sharing processing resources when two or more processing modules are processed in a frequency domain with the engine, and the sharing of processing resources can involve a reuse of processes with the engine. The processing in the frequency domain can involve utilizing one or more transforms comprising a Fast Fourier Transform (FFT), a hybrid Quadrature Mirror Filter (QMF) bank, a discrete cosine transform (DCT), a modified discrete cosine transform (MDCT), a Quadrature Mirror Filter (QMF), a pseudo-quadrature mirror filter (PQMF), or a modified FFT representation. The processing in the frequency domain can utilize a frequency domain representation of a decoder. The processing in the frequency domain may utilize a frequency-to-time domain transformation of the decoder. The audio or video processing can include: a transformation of the audio or video data from a time domain to a frequency domain; processing with the engine the transformed audio or video data with the two or more audio or video processing applications having processing modules in the frequency domain; and a transformation of the processed audio or video data from the frequency domain to the time domain. At least one of the processing modules can be configured for processing in the time domain and in the frequency domain. The method can include adjusting the performance of an A/V component by providing functionality for the A/V component in addition to the functionality of the A/V component at the time of manufacture. The A/V component can include a video display, a digital video player, a television tuner, an audio-video receiver (AVR) system, a satellite receiver, or a cable television box. The method can include adjusting an A/V component in regards to one or more factors. The one or more factors can include a setting of the A/V component, a usage history of the A/V component, a configuration of the A/V component, a resource sharing requirement for the A/V component, a performance requirement for the A/V component, an amount of processing resources, a level of quality of the A/V component, a type of content to be played on the A/V system, and/or a number of processing modules to process.

In other general aspects, techniques involve an audio/video (A/V) system comprising: one or more processing devices; and one or more storage devices storing instructions that, when executed by the one or more processing devices, cause the one or more processing devices to implement one or more audio or video processing applications for the A/V system. Each of the applications includes a processing module and data for a graphical user interface (GUI) for presentation on the A/V system. Each application is configured to adjust a performance or a setting of the A/V equipment. The system includes an audio or video processing engine configured to interact with the processing modules for the applications, in which the audio or video processing engine is configured to share processing resources among two or more of the processing modules.

These and other embodiments can optionally include one or more of the following features. The audio or video processing engine can include an audio signal analysis (ASA) module for signal analysis of audio or video data, in which the ASA module can be further configured for sharing processing resources among the applications. The A/V system can include metadata regarding the applications and the upgradable engine. The metadata can include information regarding statistics associated with the engine, the applications, a user of the A/V system, characteristics of the A/V system, and/or characteristics of the user. The engine can be configured to manage the metadata. The characteristics of the A/V system can include an age, a model, a performance specification, an amount of usage, a type of content used, a performance setting, an amount of processing resources, an input or output configuration, and/or a compatibility of the A/V equipment of the A/V system. The characteristics of the user can include an age of the user, a habit of the user, a number of downloaded applications from the user, a type of downloaded applications from the user, and/or data from a profile of the user based on a user profile or a user account. The upgradable engine can be configured to use at least one of the applications with the metadata for enhancing a quality of a sound or an image for the A/V system over the quality of the sound or the image when used without the application. The GUI can include data or utilize data to present: one or more buttons for selecting or de-selecting of the application; a description of a purpose or a function of the application; settings for configuring the A/V system; and/or a meter reading to present a measurement of a unit related to an audio or video quality. The GUI can include data and/or utilize data for each application to conform to a similar layout or design format. The processing modules can share a common application programming interface (API).

Each of the processing modules for each application can include A/V data, signal analysis modules, functional modules, and/or application programming interface (API) information. The applications can be downloadable applications. The A/V system can include a sound sensor coupled to the A/V system to detect sound conditions around the A/V system, and a light sensor coupled to the A/V system to detect light conditions around the A/V system. The upgradable engine can be configured to manage downloaded applications and adjust the performance or the setting of the A/V equipment based on the light and sound conditions. The A/V system can include a user account that includes information for the A/V user, the A/V system, and/or the downloaded and downloadable applications. The GUI can be configured to manage the information for the user account with the A/V user and an application developer. The A/V system can be configured to send statistics to the application developer over an Internet connection regarding the upgradable engine, the downloaded applications, the A/V user, characteristics of the A/V system, or characteristics of the A/V user. The A/V system can be configured to use data for the light and sound conditions to download the downloadable applications and adjust the performance or the setting of the A/V equipment. The A/V system can include and/or utilize a light and sound profile for the light and sound conditions of the A/V equipment. The light and sound profile can be stored in one of the storage devices. The A/V system can include and/or utilize a biometric profile of the A/V user, in which the A/V system can be configured to further adjust the performance or the setting of the A/V equipment based on the biometric profile of the A/V user. The biometric profile of the A/V user can include at least a hearing profile of the A/V user.

In other general aspects, a method involves accessing a plurality of processing modules for a plurality of downloadable applications. Each downloadable application includes at least one processing module and data for a graphical user interface (GUI). Each processing module is configured to interact with an upgradable engine to adjust a performance or a setting of an audio and video (A/V) equipment. The method includes arranging an order of two or more of the processing modules in a processing chain to share processing resources, to reduce a processing requirement of the A/V equipment, and/or to enhance a level of performance of the A/V equipment.

These and other embodiments can optionally include one or more of the following features. The arranging of the order of the two or more processing modules can involve using metadata to control the processing order. The metadata can relate to a processing requirement or a level of performance. The order of the processing modules can include an order in which the processing modules are processed with the upgradable engine, in which the processing order of the processing modules can be dynamically adjustable based on one or more factors. The one or more factors can include a type, an age, a performance specification, or a condition of the A/V equipment, an input configuration or output configuration on the A/V equipment, an amount of available processing resources, a number of processing modules to process, a type of processing module, user requirements, a level of a quality of the A/V equipment, a type of content to be played by the A/V equipment, a processing module to add to the processing chain, user input, information from a user profile, a usage history of the A/V equipment, a predefined processing order for a processing chain, and/or information downloaded from an application developer. Arranging the order of two or more of the processing modules can be based upon a predefined processing order for a configuration of the A/V equipment. The predefined processing order can be downloaded from an application developer. Arranging the order of two or more of the processing modules can include: assigning each of the processing modules to a level of a hierarchy of a processing chain; for each level of the hierarchy, evaluating a processing cost or a processing resource requirement to determine if the processing cost or the processing resource requirement is lower if the processing module in that level is rearranged into another level of the hierarchy; and if the processing cost or the processing resource requirement is lower if the processing module is positioned in the other level of the hierarchy, then rearranging the order of the hierarchy to position the processing module in the level that produces the lower processing cost.

In other general aspects, an audio/video (A/V) system includes downloadable applications for an A/V system. Each of the downloadable applications includes a processing module and data for a graphical user interface (GUI) for presentation on the A/V system. Each downloadable application is configured to adjust a performance or a setting of the A/V equipment. The system includes an upgradable engine configured to interact with the processing modules for the downloadable applications. The upgradable engine is configured to share processing resources in the A/V system for the processing module. The upgradable engine is configured to manage downloaded applications and adjust the performance or the setting of the A/V equipment based on one or more factors.

These and other embodiments can optionally include one or more of the following features. The A/V system can include and/or utilize a user account that comprises information for the A/V user, the A/V system, and the downloaded and downloadable applications. The GUI can be configured to manage the information for the user account with the A/V user and an application developer. The A/V system can be configured to send statistics to the application developer over an Internet connection regarding the upgradable engine, the downloaded applications, the A/V user, characteristics of the A/V system, and/or characteristics of the A/V user. The one or more factors can involve a type of A/V equipment, an input configuration of the A/V equipment, an output configuration of the A/V equipment, a specification of the A/V equipment, a level of quality of the A/V equipment, and/or a usage history of the A/V equipment. The one or more factors can involve an amount of processing power available for the A/V system, a number of applications for processing, a type of application for processing, or a type of application available for downloading. The one or more factors can also involve a type of A/V content to be played on the A/V system, a user preference, or a user input. The one or more factors can include an age of the A/V equipment or a level of degradation of performance of the A/V equipment over time. At least one of the applications can be configured to correct for the level of degradation of performance of the A/V equipment. The A/V system also can include and/or utilize a biometric profile of the A/V user. The A/V system can be configured to further adjust the performance or the setting of the A/V equipment based on the biometric profile of the A/V user. The biometric profile of the A/V user can include a hearing profile of the A/V user.

In other general aspects, techniques involve a method for audio and video (A/V) equipment. The method includes sending a processing module for at least one of a plurality of downloadable applications from an application developer over an Internet connection to A/V equipment for an A/V user. Each downloadable application includes at least one processing module. Each downloadable application can be configured to interact with an upgradable engine to adjust a performance or a setting of the A/V equipment. The method includes sending statistics from the A/V equipment to the application developer over the Internet connection. The statistics includes information for the upgradable engine, the downloaded applications, the A/V user, characteristics of the A/V equipment, and/or characteristics, habits, or demographics of the A/V user. The method includes forwarding at least some of those statistics from the application developer to a content provider or a manufacturer of the A/V equipment, and transmitting fee information between the application developer and the content provider or between the application developer and the manufacturer of the A/V equipment.

These and other embodiments can optionally include one or more of the following features. The method can involve processing the processing module with the upgradable engine. The processing can involve sharing processing resources for two or more processing modules when the two or more processing modules are used to interact with the upgradable engine, and adjusting the performance of A/V equipment using the upgradable engine and the processing module. The fee information can involve information for making arrangements for sending a fee from the application developer to the content provider. The application developer can make arrangements to pay the content provider or the manufacturer of the A/V equipment. The method can involve sending an advertisement that promotes the applications of the application developer to the A/V equipment for the A/V user. The advertisement can be configured for presentation on the A/V equipment. When A/V content is purchased from the content provider by the A/V user, the advertisement can be sent with A/V content from the content provider. When sending the processing module, the method can involve sending the processing module for at least one of the plurality of downloadable applications from a first computer associated with the application developer over the Internet connection to A/V equipment for the A/V user. When sending the statistics, the method can involve sending the statistics from the A/V equipment to the first computer associated with the application developer over the Internet connection. When forwarding at least some of those statistics, the method can involve forwarding at least some of those statistics from the first computer associated with the application developer to a second computer associated with the content provider or a third computer associated with the manufacturer of the A/V equipment. When transmitting the fee information, the method can involve transmitting the fee information between the first computer associated with the application developer and the second computer associated with the content provider or between the first computer associated with the application developer and the third computer associated with the manufacturer of the A/V equipment. The method can involve the following processes utilizing multiple computers: forwarding information from the second computer associated with the content provider to the first computer associated with the application developer regarding a type of content, target audiences for A/V content, or market information; determining at least one processing module from the first computer associated with the application developer to send to the A/V equipment for the A/V user based on the information from the second computer associated with the content provider; and sending the at least one processing module over the Internet connection from the first computer associated with the application developer to the A/V equipment for the A/V user based on the information from the second computer associated with the content provider. The content provider can associate the A/V content with an advertisement for the downloadable applications and promote the downloadable applications to the A/V user along with the A/V content that the content provider provides or develops for the A/V user. The method can involve sending the fee information from the first computer associated with the application developer to the third computer associated with the manufacturer of the A/V equipment. The fee information can also include information for making arrangements for sending a fee from the application developer to the manufacturer of the A/V equipment. The method can include the following processes from multiple computers: forwarding information from the third computer associated with the manufacturer of the A/V equipment to the first computer associated with the application developer, determining at least one processing module from the application developer to send to the A/V equipment for the A/V user based on the information from the manufacturer of the A/V equipment; and sending the at least one processing module over the Internet connection from the first computer associated with the application developer to the A/V equipment for A/V user based on the information from the third computer associated with the manufacturer of the A/V equipment. The forwarded information can include data, specification, and/or statistical information for the A/V equipment. The method can include sending additional statistics related to the A/V user to the first computer associated with the application developer over the Internet connection. The statistics can include and/or related to user biometric information, user ratings, a user profile, a viewing or listening schedule of the A/V user, and/or a usage of downloaded applications. The method also can include sending A/V content from the second computer associated with the content provider to the A/V equipment for the A/V user.

Any of the methods and techniques described herein can also be implemented in a system with one or more components, an apparatus or device, a machine, a computer program product, in software, in hardware, or in any combination thereof. For example, the computer program product can be encoded on a computer-readable medium, and can include instructions to cause a data processing apparatus (e.g., a data processor) to perform one or more operations for any of the methods described herein.

To illustrate how these techniques can be implemented, several example embodiments are depicted and described.

System Overview

FIG. 1 depicts a diagram with an example of a home theater system 100 with an upgradeable audio and/or video processing engine. The system includes audio-visual components, such as a television or video monitor 105, one or more media devices 110 (e.g., a DVD player, a digital video recorder, a digital television (DTV) tuner, or a satellite or cable box), and audio-video receiver (AVR) system, and one or more channels of speakers 140A-140F. These components are coupled using, for example, a wired or wireless High-Definition Multimedia Interface (HDMI) or other network 122. A first router 120 is coupled to the network 122 and can communicate with a second router 135 over a wired or wireless HDMI, WiFi, or other network 127. The second router 125 is coupled to a general or special purpose digital processing system 130, such as a digital signal processing (DSP) system or a general purpose computer.

The computer system 130 implements an upgradeable/extensible audio and/or video processing engine. The audio and/or video processing engine may be implemented in software, firmware, hardware, or some combination of software, firmware, or hardware. The audio and/or video processing engine may be designed to perform basic or underlying audio and/or video processing manipulations, which may allow various audio and/or video processing applications to be designed to run on the audio and/or video processing engine and perform particular audio and/or video processing functions. For example, a speech clarity processing application may be designed to run on the processing engine and process audio information to improve the clarity of speech in the audio information. One or more examples of such an audio and/or video processing engine are described below.

The audio and/or video processing engine and applications implemented on computer 130 can process audio and video ("A/V") information from one or more of the audiovisual components 105, 110, or 115 to apply the audio and/or video processing functions implemented by the applications to the A/V information. The processed A/V information may then be sent from the computer to an appropriate one or the audiovisual components 105, 110, or 115. The unprocessed A/V information may be sent from an audiovisual component 105, 110, or 115 across the routers 120 and 125 to the computer system 130, and processed A/V information may be sent from the computer system 130 across the routers 120 and 125 to the appropriate audiovisual component 105, 110, or 115.

The computer system 130 also implements, for example, a web interface 132. The web interface 132 may allow a user to access, for example, a webpage from which the user can download and install audio and/or video processing applications to update their home theater system 100. The web interface 132 also may allow the user to access, for example, a webpage showing a user account and/or a status of audio and/or video processing applications that are present on the home theater system 100. User account information may be managed and stored at a computer and/or a database provided at an application developer or provider. In some embodiments, the application developer and the application provider may be the same entity. For example, various audio and/or video processing applications may be developed, stored, and/or provided by computers and database systems from Dolby Laboratories, Inc. of San Francisco, Calif. The user's account can provide a list of all applications that have been purchased and/or applications that are in current use by the user on the user's system. The user's account may also display new applications that the user can download based on the user's system and preferences. The web interface 132 may be displayed, for example, on a monitor associated with the computer system 130 or on the television or video monitor 105.

A user interface that provides user control of the audio and/or video processing applications running on the audio and/or video processing engine may be displayed on the television or video monitor 105. The user interface on the television or video monitor 105 can be overlaid over an image from a movie, program, or show that may be playing on the television. For example, the computer system 130 may overlay the user interface on video information processed by the audio and/or video processing engine and applications. The image may be a still picture or a motion picture. The user interface on the television or video monitor 105 may be controlled by a remote control associated with the television 105, the media device 110, or the AVR system 115.

The system 100 can include several components for a flexible, upgradable processing engine. The system 100 can provide for real-time processing of audio and video over HDMI (or another type of network) with audio/video consumer electronic equipment. The audio/video equipment may or may not have applications for the audio and/or video processing engine installed when the audio/video equipment was purchased by the user. However, the system 100 may allow a user to download and install audio and video applications for their electronic equipment.

While the audio and/or video processing engine has been described as being implemented on the computer system 130, the audio and/or video processing engine may be implemented, either additionally or alternatively, on one or more of the television or video monitor 105, the routers 120, 125, the AVR system 115, or the media device 110.

Figure 2:
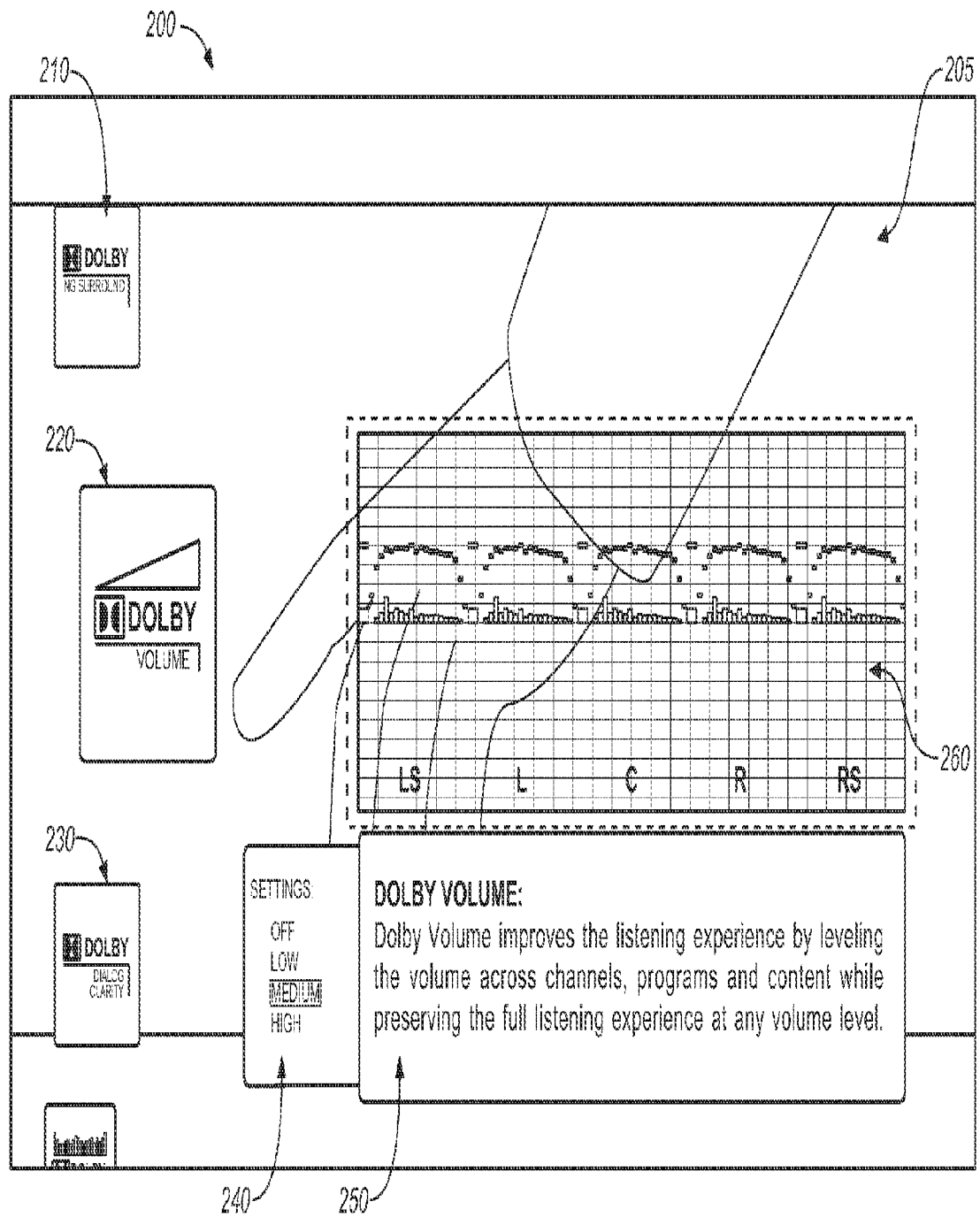
FIG. 2 depicts a diagram of an example of a graphical user interface (GUI) for selecting and controlling audio and/or video processing applications that run on the audio and/or video processing engine.

FIG. 2 depicts a diagram of an example of a graphical user interface (GUI) 200 for controlling or otherwise interacting with the audio and/or video processing applications installed to run on the audio and/or video processing engine. The GUI 200 may be displayed, for example, on the television or video monitor 105.

In the GUI 200, an image 205 from a movie, program, or show is playing on the television. The image 205 may be presented as a background image. The GUI 200 may be displayed on top of the image 205, in which the GUI 200 may be partially transparent to allow the user to see the content that is playing or being displayed. Installed audio and/or video processing applications 210, 220, 230 can be shown on the left-hand side of the image 205, and a user can select one of the applications, such as the audio volume leveling application 220 for managing loudness variations between different content and audio sources (e.g., Dolby® Volume), to control or otherwise interact with the application. Each application may have data for its own user interface within the GUI 200. For example, a first panel 240 for settings can allow the user to activate or deactivate the application 220. A second panel 250 can provide a description of the application to the user. For instance, in the example shown, the description of the selected application 220 explains that "Dolby® Volume improves the listening experience by leveling the volume across channels, programs and content while preserving the full listening experience at any volume level."

A user can use a controller (e.g., a remote control for the television or some other component of the system 100) to control the selection of the application and the settings for each application. In some embodiments, the controller may be specific to the audio/video engine running the software for the GUI 200. The user can explore, activate, and control the various applications that are installed in the system using the GUI 200.

A third panel 260 is provided to provide visual feedback to the user to allow the user to visualize the settings or changes. The third panel 260 may have charts, graphs, and data for settings that may change interactively with changes in the settings or changes in the content or media playback. For example, if the audio leveling application 220 is selected and the setting in the first panel 240 is in the "OFF" position, then the third panel 260 can display charts and graphs for the playback channels with no leveling processing applied. If the setting in the first panel 240 is placed in the "MEDIUM" position, then the third panel 260 can display charts and graphs for the playback channels with time and frequency dependent gains being applied to provide an audio leveling function. The playback data presented in the charts and graphs for the respective speakers may be moving interactively and/or may use animation whenever the system is playing, such as for an audio and gain adjustment readout for each speaker. For example, the third panel 260 in the GUI 200 is illustrating the content level and audio gains adjustments being applied to 5.1 channels. A menu presented for the GUI 200 may be presented that is interactive and intuitive for the user.

The GUI 200 may vary from what is shown in FIG. 2. For example, there may be a GUI that allows a user to display and/or change a status of several applications simultaneously. There may be other GUIs linked to the main GUI 200 to control other features or submenus. Any of the other GUIs may also provide real-time interaction and information exchanges with applications working with the audio and/or video engine.

Figure 3:
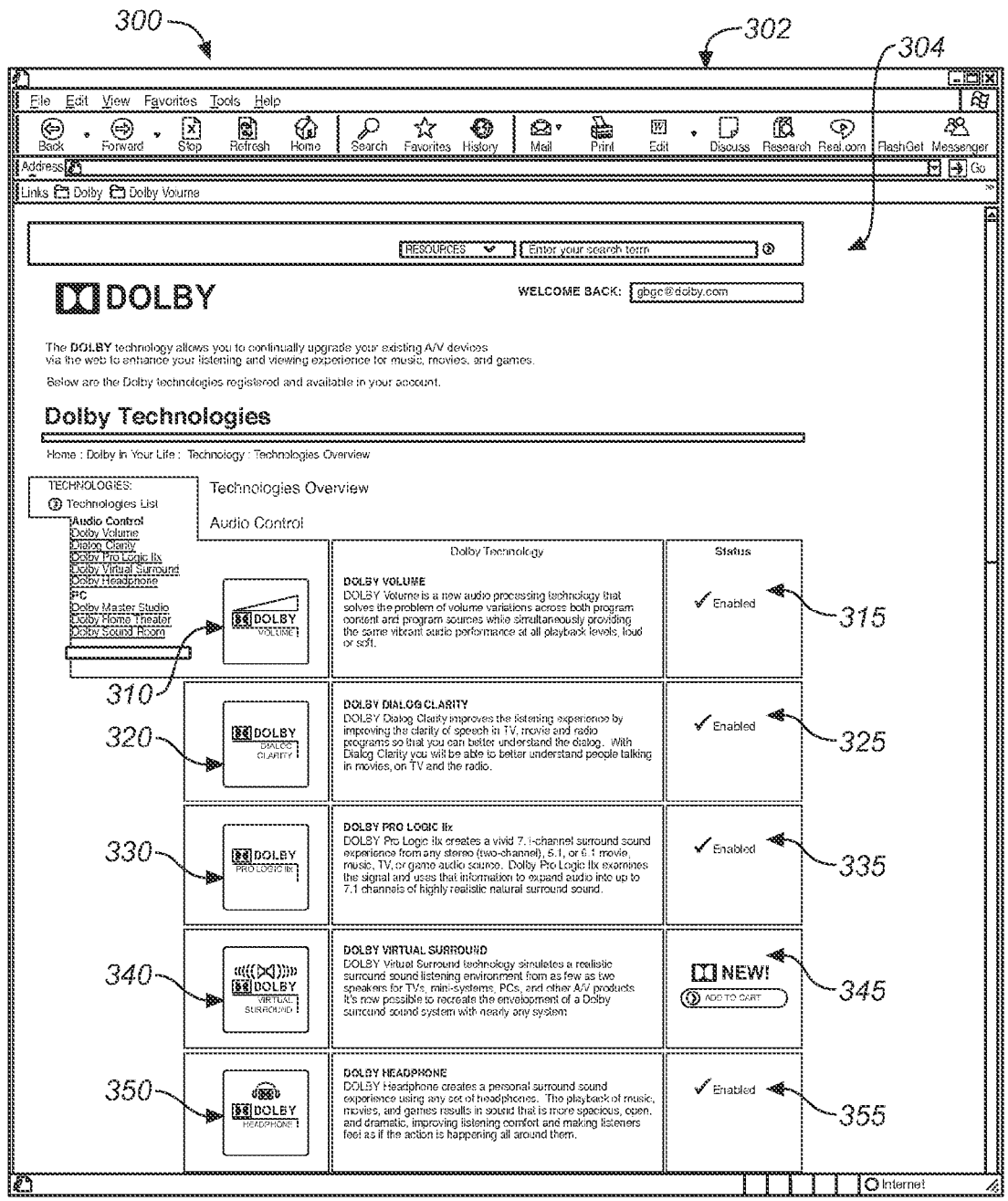
FIG. 3 depicts a diagram of an example of a graphical user interface for obtaining applications that run on the audio and/or video processing upgradeable engine.

FIG. 3 depicts a diagram of an example of a graphical user interface (GUI) 300 for obtaining and installing audio and/or video processing applications for the audio and/or video processing engine. The GUI 300 may include, for example, a web browser 302 that retrieves and displays a web page 304 that allows the user to obtain and download the audio and/or video processing applications. The web page 304 may show applications with descriptions, such as for Dolby® Volume 310, Dolby® Dialog Clarity 320, Dolby® Pro Logic IIx® 330, Dolby® Virtual Surround 340, and Dolby® Headphone 350. Other applications, including non-Dolby applications, may be included in the GUI 300. The GUI 300 has indicators 315, 325, 335, 355 for each application to specify if the application has been downloaded and enabled on the user's system 100. The GUI 300 also has an indicator 345 to notify the user that new applications are available for downloading and installing on their system. The system 100 can facilitate the deployment of applications to be used with the processing engine, and/or can facilitate and encourage users to upgrade to new or uninstalled applications for their audio/video electronic equipment. Each user can have a user account, password (for authentication), and a history of previously purchased applications, so the user can assess which applications have been purchased in the past, as well as view a list of new applications and descriptions that the user has not purchased. The user account may also include information for users, habits (e.g., the programs viewed and their A/V settings), and their equipment, such as A/V equipment (e.g., television, DVD player, receiver), which can be used to select appropriate applications and predetermined conditions for those applications for purchase and download.

When A/V electronic equipment is manufactured, it may be shipped for distribution and use with pre-installed software for running various audio and/or video processing applications. For example, a television may be shipped with software for an audio and/or video processing application (e.g., Dolby® Surround) and may not be able to upgrade their audio/video application or add recent, newly-developed audio/video applications. The time from which applications are developed at the application developer to the time those applications are released in a product for sale in the marketplace can be appreciable. For example, it may take over a year for a newly developed application to be released in a product. Embodiments relate to providing applications to the user, as in the GUI 300, enabling users to install the latest audio/video applications for their electronic equipment without inconvenient delay. Hence, new applications and technologies from the application developer can be released to users, and users may be able to upgrade the functionality of their A/V electronic equipment.

Figure 4A:
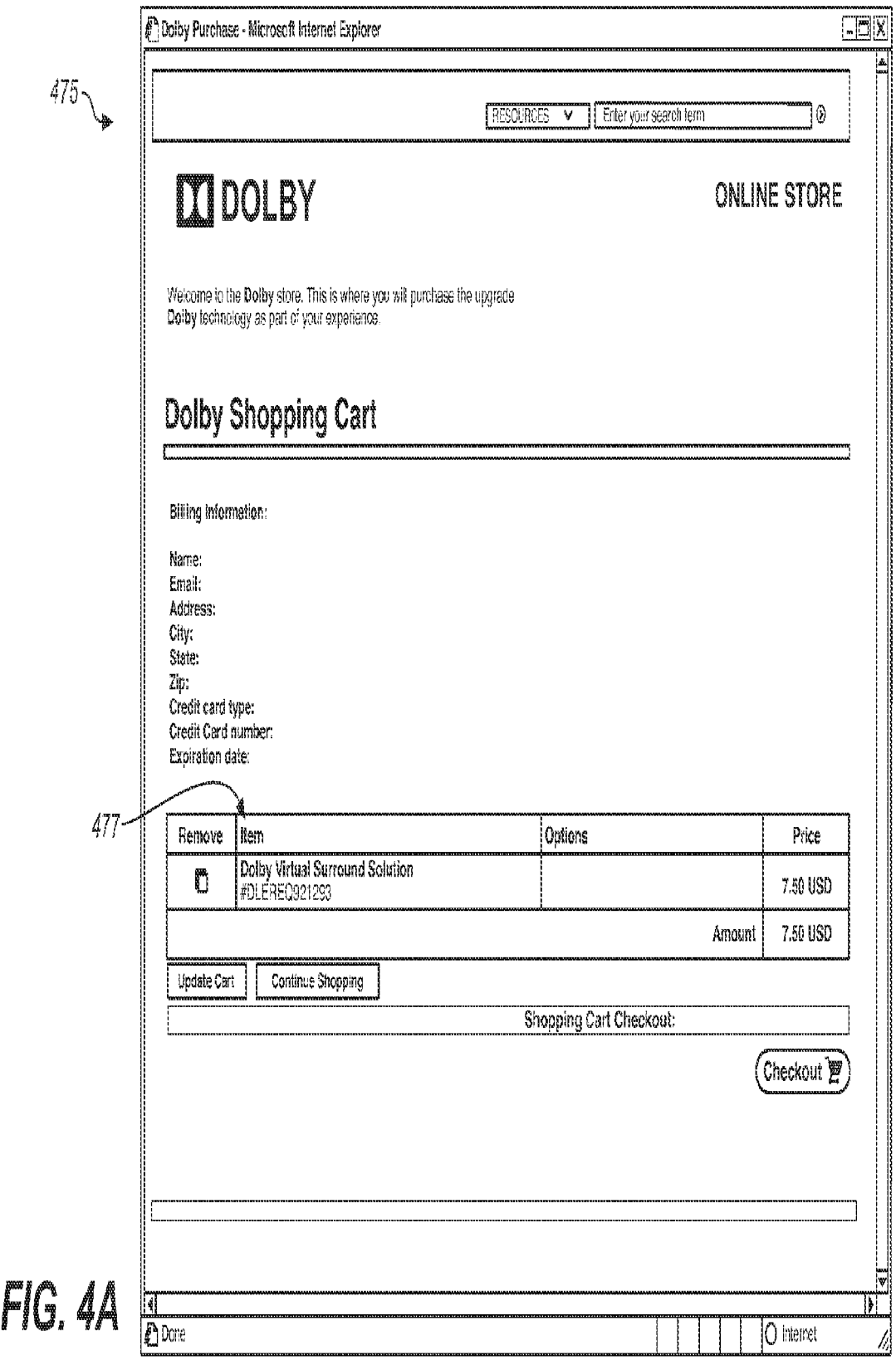
FIG. 4A depicts an example of a selection of an application to download from a graphical user interface (GUI).
Figure 4B:
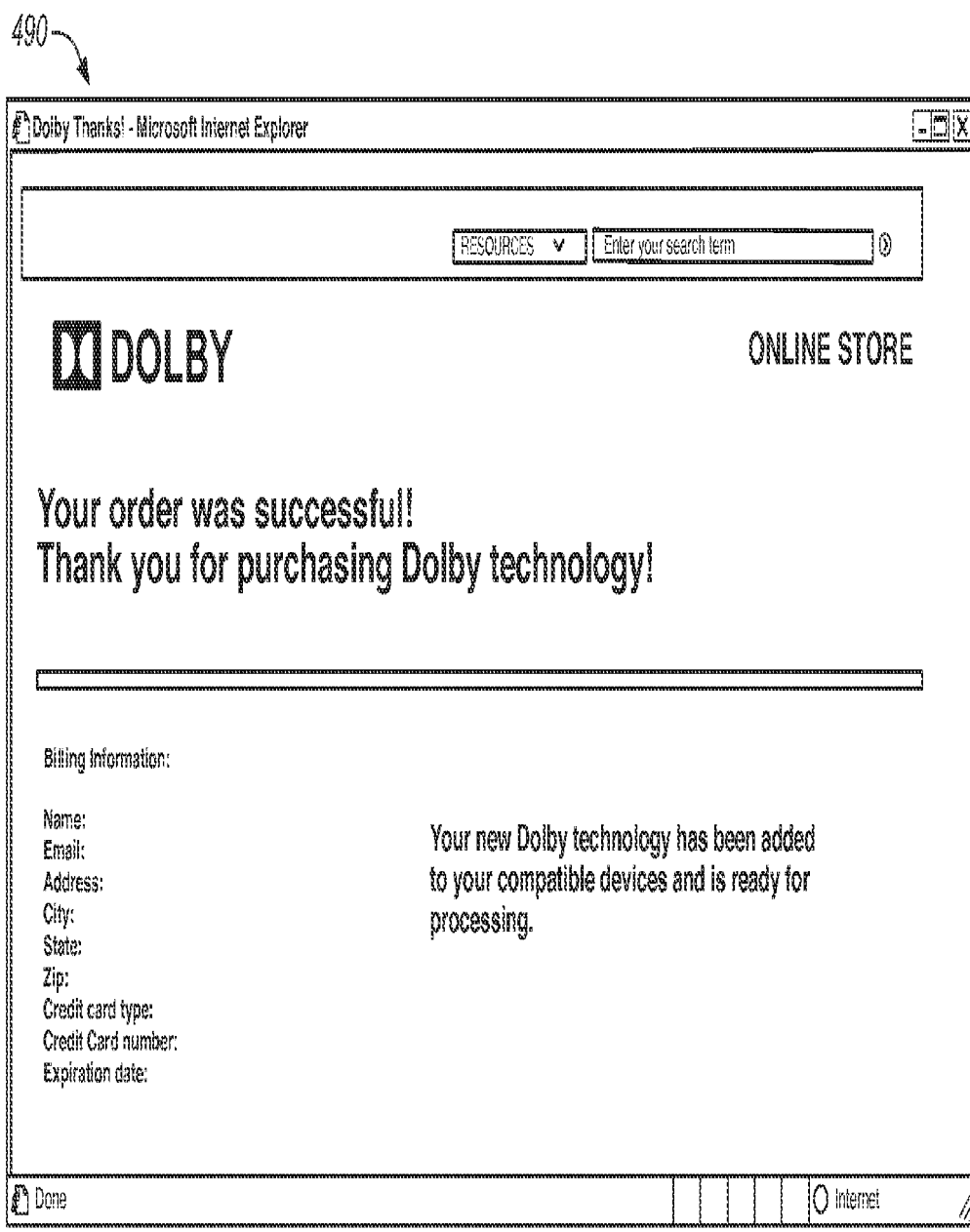
FIG. 4B depicts an example of a confirmation of a purchase and download of an application.
Figure 4C:
FIG. 4C depicts a graphical user interface for notifying an A/V user that their A/V electronic equipment can be upgraded with new applications.

FIG. 4A depicts an example of a selection of an application to download from a graphical user interface (GUI) 475. In the GUI 475, the application can be selected from an online store to purchase for a particular price, added to a checkout cart for the user, and the user can complete the checkout process and download the application to their A/V system. Information can also be stored in the user profile for user purchases, such as the user purchase of the application 477 in FIG. 4A, and the information may be stored with and recalled along with a user account to facilitate future purchases of applications. FIG. 4B depicts an example of a confirmation 490 of a purchase and download of the application. The confirmation 490 may also include an indication to the user that the application has also been installed on their A/V system. FIG. 4C depicts a graphical user interface 495 for notifying an A/V user that their A/V electronic equipment can be upgraded with new applications. The graphical user interface 495 in FIG. 4C shows a notice 497 that the viewer can upgrade the features and performance of their existing A/V system with new applications from the application developer.

Engine and Applications

Figure 5:
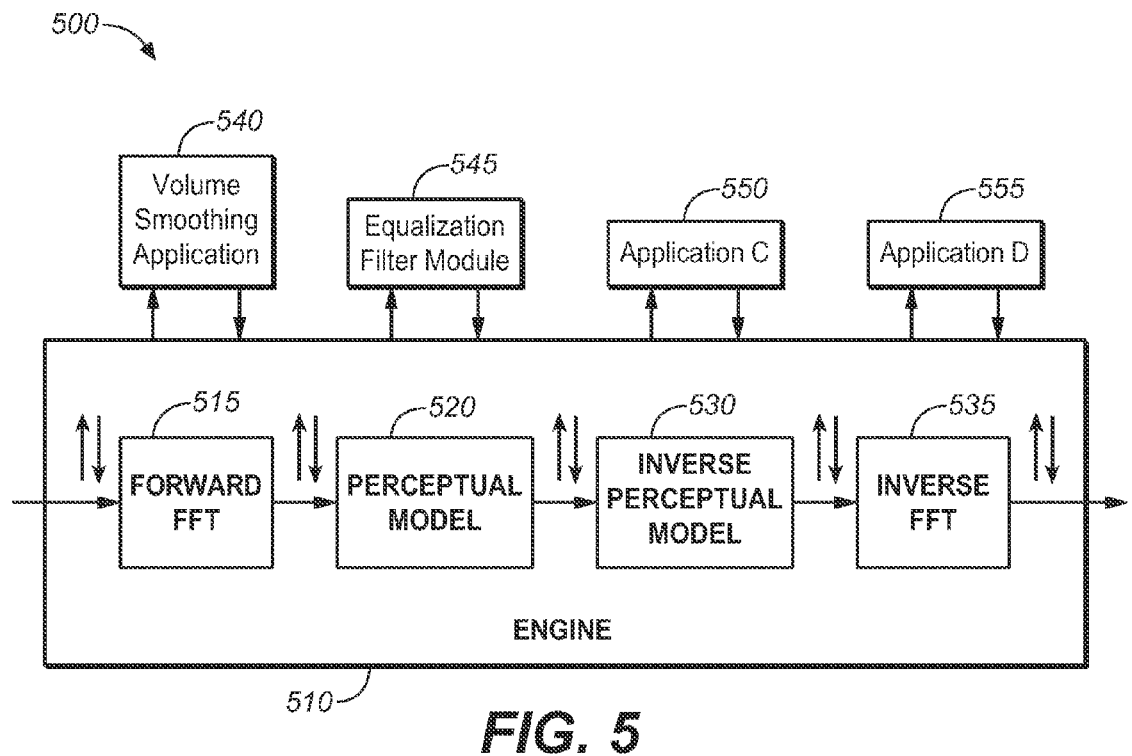
FIG. 5 depicts a diagram of an example of the upgradable audio and/or video processing engine and processing modules and implementing particular processing applications.

FIG. 5 depicts a diagram of an example of a system 500 that includes an upgradeable/extensible audio processing engine 510 with audio processing applications 540, 545, 550, and 555. The engine 510 may perform basic manipulations to generate several signal representations that are employed by the audio processing applications 540, 545, 550, and 555. The signal representations generated by the engine 510 may be those that are common to many post-processing algorithms and computationally costly relative to the other computations used in the post processing algorithms (for example manipulation of the computed signal representations). The applications 540, 545, 550, and 555 retrieve the appropriate signal representation(s) from the engine 510, modify the representation(s) according to the application, and return results back to the engine 510.

In the engine 510, audio is transformed from the time domain to the frequency domain, to the perceptual domain, back to the frequency domain, and back to the time domain. In particular, the engine 510 includes a forward Fast Fourier Transform (FFT) module 515, a perceptual model module 520, an inverse perceptual model module 530, and an inverse FFT module 535. The forward FFT module 515 produces a FFT representation of incoming audio data. In some embodiments, the perceptual model module 520 can model human hearing, in which the model can transform audio into a representation that perceptualizes frequency and/or represents how the brain perceives sound. The perceptual model module 520 may take into account the nonlinearities and transformations of human hearing and sound, as well as performing scaling and manipulation of the audio data. The inverse perceptual model module 530 undoes the modeling and manipulations of the perceptual model module 520. The inverse FFT module 535 performs an inverse FFT for the results from the inverse perceptual model module 530.

The applications interacting with the engine 510 include a volume smoothing module (e.g., Dolby Volume®) 540, equalization filter module 545, Application C 550, and Application D 555. Rather than computing the appropriate signal representations themselves, the applications 540, 545, 550, and 555 may instead retrieve the appropriate representation from the engine 510. For example, volume smoothing and speech clarity process modules may use a perceptual representation, which is derived from an FFT, and an equalization module may use an FFT representation. Rather than each application individually computing the FFT and/or perceptual representation, the applications may access the appropriate representation from the engine 510 and, as a result, the appropriate representation may be computed only once by the engine 510. This may reduce the computational complexity of the combined processes compared to the computational complexity if the processes each compute the appropriate representations.

The volume smoothing application 540 addresses volume variations across both program content and program sources while simultaneously proving vibrant audio performance at all playback levels, whether soft or loud. The volume smoothing application 540 can operate on a perceptual representation that is retrieved from between the perceptual model module 520 and the inverse perceptual model module 530 of the engine 510. The volume smoothing application 540 can automatically adjust the loudness of an audio signal by modifying the perceptual representation that is derived from the FFT representation.

The equalization filter application 545 can retrieve from the engine 510 an FFT representation, modify the FFT representation to perform equalization, and pass back the processed FFT representation to the engine 510 at a point prior to the inverse FFT module 535. The engine 510 may interact with other applications in addition to or instead of the applications 540, 545, 550, 555 shown in FIG. 5.

The engine 510 may have other modules instead of or in addition to the modules shown in FIG. 5. For example, a module for a hybrid Quadrature Mirror Filter (QMF) bank can be used instead of the Forward FFT module 515, and module for an inverse hybrid QMF bank can be used instead of the inverse FFT module 535. Also, there may be some processes that may be processed in the time domain, and other processes that may be processed in the frequency domain. The number and type of process modules may be dynamically added to or removed from the engine 510 based on the requirements for the processing resources of the system.

Other applications that can be used with the engine may include, for example, up-mixing, virtual sound, dialog enhancement, content-adaptive equalization, and acoustic environment compensation. In some embodiments, the applications can reuse much of the software from the engine through a standard application programming interface (API), and the effort to port an application may only involve the software that modifies the engine. New applications can be developed and sent to existing consumer electronic products instead of only being available for electronic products during the manufacturing stage of the electronic product cycle. As a result, a time for the new applications to reach the marketplace can be reduced since these applications can be brought to the market shortly after their development.

Figure 6:
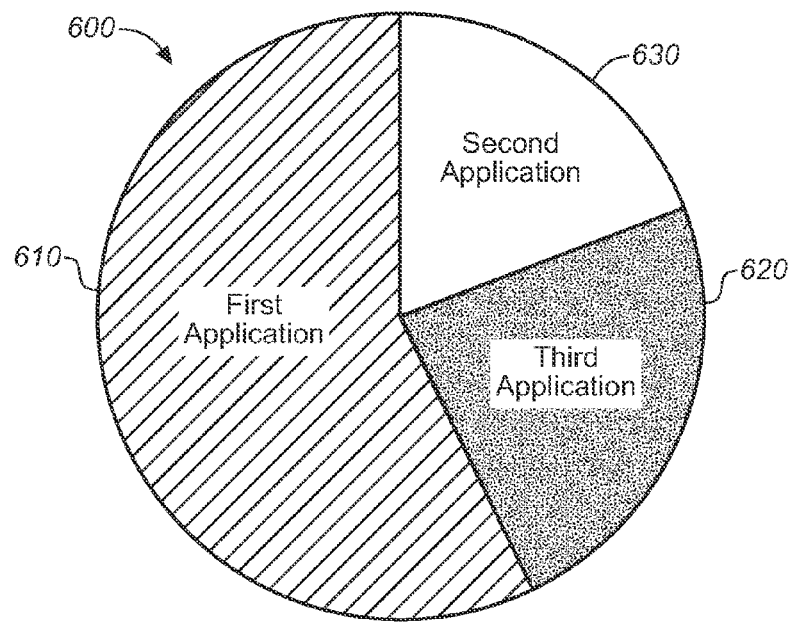
FIG. 6 depicts a diagram with an example of running processes without the upgradable engine.

FIG. 6 depicts example computational costs, which may be associated with running three processing modules independently and without the engine. For example, the example computational costs may represent those that may typify three example application processing modules: (1) a first application 610 for rendering a 5.1 (or more) channel home theater audio presentation; (2) a second application 630 for creating a surround sound experience from any stereo, two-channel movie, music, TV, or game audio source; and (3) a third application 620 that delivers a surround sound experience from any pair of stereo speakers, such as speakers for small rooms, home offices, or bedrooms, e.g., where more than a simple or inexpensive speaker system may not be practical.

For example, the computational costs for the pie chart 600 may relate to a representation of a two-channel playback system, in which stereo content can be up-mixed to 5.1 channels (i.e., 6 channels) using the processes related to the second application 630 for creating a surround sound experience from any stereo, two-channel movie, music, TV, or game audio source (e.g., Dolby® Pro Logic II™). The computational costs are largest for the processing module for the first application 610 when the engine is not used.

Embodiments use the engine to enable the computing resources of the processes to overlap, share resources, and/or share information. For example, an embodiment functions to level the six channels with the processing module for the surround-sound application, and uses the processing module for the application that delivers a surround sound experience from any pair of stereo speakers to effectuate virtual surround sound.

Figure 7:
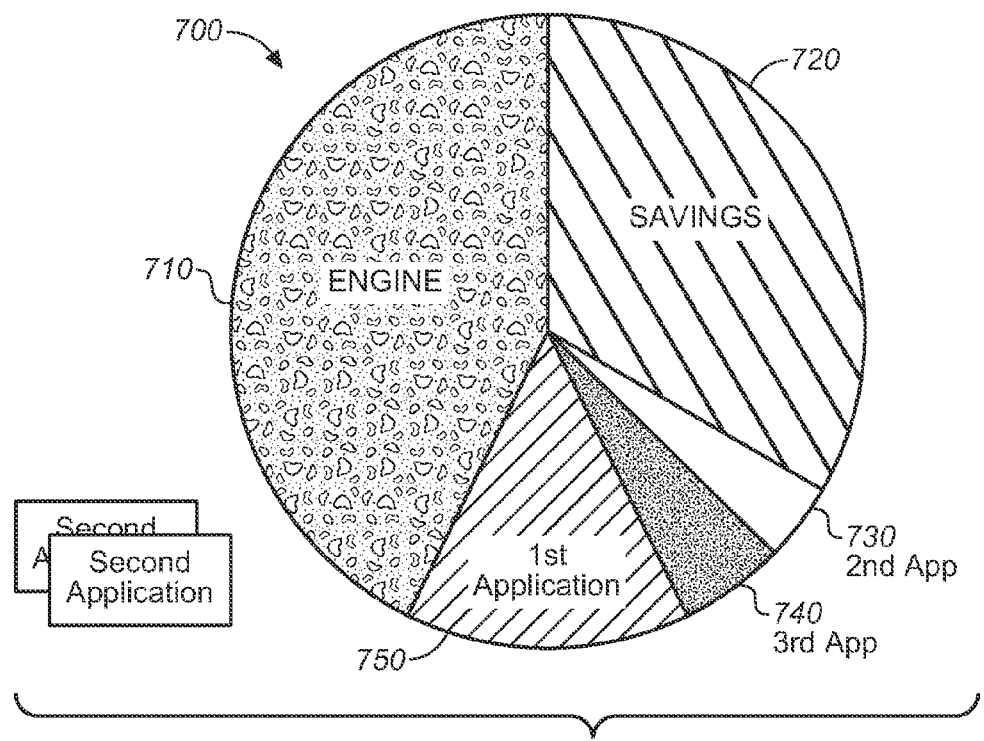
FIG. 7 depicts a diagram with an example of running processes with the upgradable engine.

FIG. 7 depicts a diagram with an example of running processes for various applications with the upgradable engine. In particular, FIG. 7 shows a pie chart 700 with the computational costs of running three processing modules for various applications with the engine. For these applications, the computational costs are shown for a processing module for 5.1 channels for a first application 750 (e.g., Dolby® Volume), a processing module for a second application 730 (e.g., Dolby® Pro Logic II™), a processing module for a third application 740 (e.g., Dolby® Virtual Speaker), the engine 710, and the computational savings 720 when compared to not using the engine 710. Embodiments use the engine, which shares processing resources and thus reduces computational costs and complexity. In this example, the computational costs of the processes for the first application 750, the second application 730, and the third application 740 are all less than the computational costs of these processes without the engine, as shown in FIG. 6. The computational savings 720 shown in FIG. 7 is 33%. In some embodiments, the relative savings from using the engine can increase as more modules are used with the engine 710.

Figure 8:
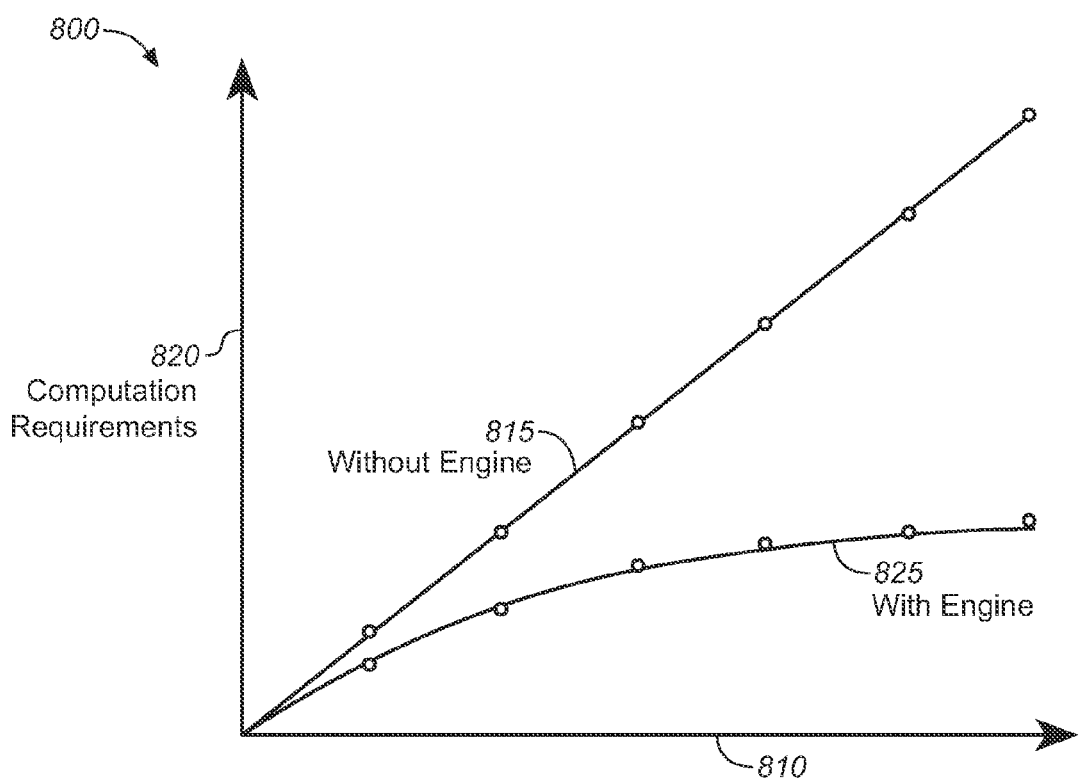
FIG. 8 depicts a diagram with an example of the processing requirements for a number of applications with and without the upgradable engine.

FIG. 8 depicts a diagram with an example of the processing requirements for a number of applications with and without the upgradable engine. In particular, a chart 800 is shown with an example that graphs the computation requirements 820 for a number of applications 810. Without the engine 815, the computation requirements 820 increase linearly as the number of applications increases. With the engine 825, resources for multiple processing modules are shared and the computation requirements increase less than when compared to without the engine 815. In some embodiments, the computation requirements may vary from what is shown in the chart 800. For example, the computation requirements 820 without the engine 815 may not increase linearly, as in FIG. 8. In FIG. 8, the computation requirements 820 with the engine 825 may only slightly increase after a certain number of applications are utilized. In those examples, the computation requirements with the engine 815 are less than the computation requirements without the engine 825.

Figure 9:
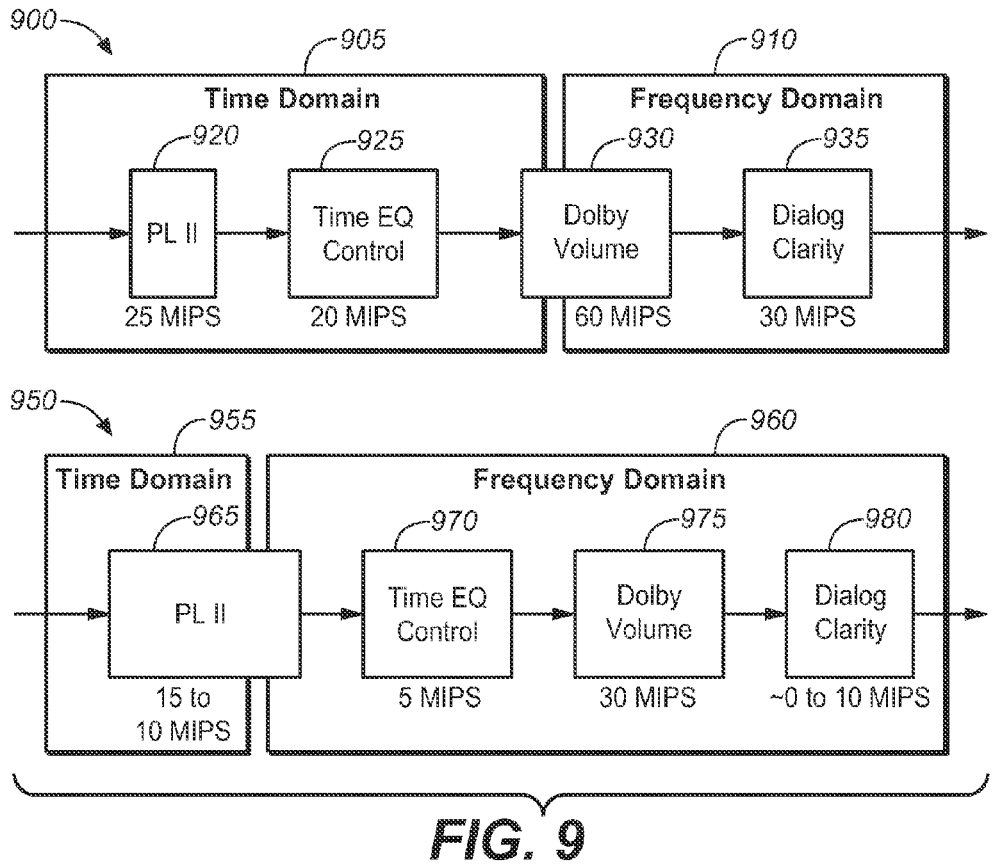
FIG. 9 depict examples of process requirements with and without the upgradable engine.

FIG. 9 depicts examples of process requirements with and without the upgradable engine. The embodiments 900, 950 may involve examples of A/V system configurations for when a user may want to upgrade their existing audio electronic equipment to have better sound and audio clarity. The applications in the embodiment 900 that do not share resources with the engine have processing modules for Dolby® Pro Logic II 920, Time Equalization Control 925, Dolby® Volume 930, and Dialog Clarity 935. The processing modules for Dolby® Pro Logic II 920 and Time Equalization Control 925 are in the time domain 905, and the processing module for Dialog Clarity 935 is in the frequency domain 910. In this embodiment 900, the processing module for Dolby® Volume 930 can receive data in the time domain 905 and send data in the frequency domain 910. The processing requirements for the module for Dolby® Pro Logic II 920 is 25 Million instructions per second (MIPS), the module for Time Equalization Control 925 is 20 MIPS, the module for Dolby® Volume 930 is 60 MIPS, and the module for Dialog Clarity 935 is 30 MIPS. When summed, the total processing requirements for the embodiment 900 is 135 MIPS.

The applications in the embodiment 950 that shares resources with the engine have processing modules for Dolby® Pro Logic II 965, Time Equalization Control 970, Dolby® Volume 975, and Dialog Clarity 980. In this embodiment 950, the processing module for Dolby® Pro Logic II 965 can receive data in the time domain 955 and send data in the frequency domain 960. The processing modules for Time Equalization Control 970, Dolby® Volume 975, and Dialog Clarity 980 are in the frequency domain 960. The processing requirement for the module for Dolby® Pro Logic II 965 is 10-15 MIPS, the module for Time Equalization Control 970 is 5 MIPS, the module for Dolby® Volume 975 is 30 MIPS, and the module for Dynamic Equalization 980 is approximately 0-10 MIPS. The total processing requirements for the embodiment 950 is 45 MIPS to 60 MIPS, which may represent as much as a two-thirds savings in processing requirements in relation to embodiment 900. The processing modules and the corresponding processing requirements in FIG. 9 are shown as an example of the savings in processing requirements by sharing resources and using the engine. The processing requirements, processes, and/or processing savings may differ from what is shown in FIG. 9.

Figure 10:
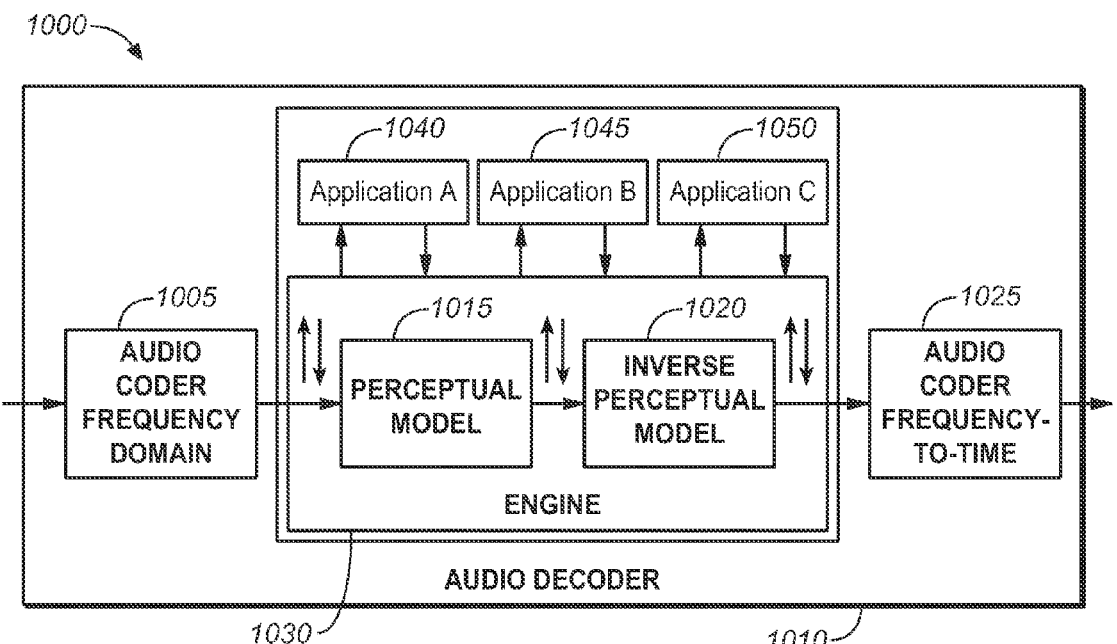
FIG. 10 depicts an example of a system that includes an upgradable engine that is integrated with an audio decoder.

FIG. 10 depicts an example of a system 1000 that includes an upgradable engine 1030 that is integrated with a low-bit rate audio decoder 1010, such as in advanced audio coding (AAC) or high-efficiency advanced audio coding (HE-AAC). Decoders can have their own internal frequency domain representations, and those representations can be compatible with post processing modules. FIG. 10 shows an audio decoder 1010 that includes a first audio partial decoder 1005 that converts low-bit rate compressed audio data from the compressed audio bit-stream domain to the frequency domain, an engine 1030 with applications (application A 1040, application B 1045, application C 1050), and a second low-bit rate audio decoder component 1025 that converts data from the frequency domain to the time domain for the processed audio data. The engine 1030 includes a perceptual model module 1015 and an inverse perceptual model module 1020, and the engine 1030 interacts with the processing modules 1040, 1045, 1050.

Part of the computational cost of the processing of the engine may involve the transforming time domain related data to the frequency domain and vice versa. In engine 510 (FIG. 5), the frequency domain representation can be provided by an FFT (and with an inverse operation, returned to the time domain). In FIG. 10, the engine 1030 is modified to use other frequency domain representations, such as those of audio coders. In FIG. 10 the forward FFT module 515 and the inverse FFT module 535 of FIG. 5 are not included because the representations from those modules are replaced by the decoder's frequency representation. For example, the engine 1030 can use a modified discrete cosine transform (MDCT), as used by some of the post processing modules, as well as a pseudo-quadrature mirror filter (PQMF), as used by high-efficiency advanced audio coding (HE-AAC) techniques. By directly utilizing the frequency domain representation of an audio decoder and the decoder's corresponding frequency-to-time transformation, the total computational cost when the using engine may be reduced.

In some embodiments, the decoder for audio can have a first decoding module that can take the encoded bitstream, and then create a frequency representation of the signal. The engine can then pass the processed frequency representation data to the component of the decoder that fully translates the frequency domain audio data to the time domain for playback and reproduction over speakers or headphones.

Figure 11:
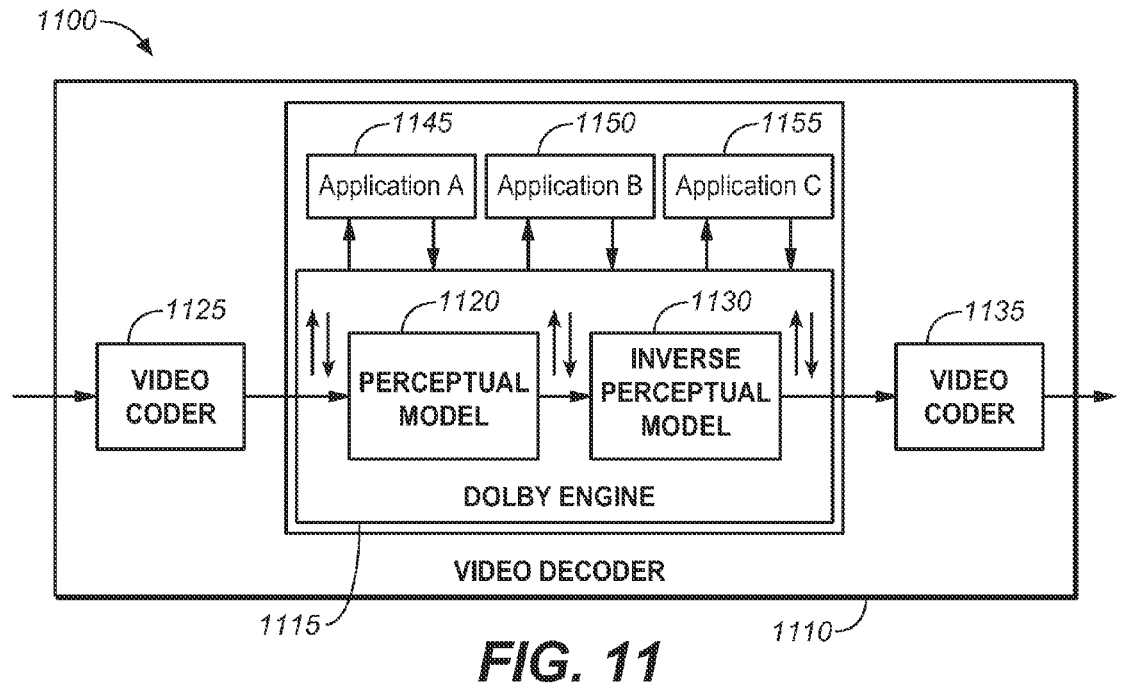
FIG. 11 depicts an example of a system that includes an upgradable engine that is integrated with a video decoder.

FIG. 11 depicts an example of a system 1100 that includes an upgradable engine 1115 that is integrated with a video decoder 1110. FIG. 11 shows a video decoder 1110 that includes a first video coder 1125 that converts video data 1105 from the time domain to the frequency domain, the engine 1115, which interacts with applications (application A 1145, application B 1150, application C 1155), and a second video coder 1135 that converts data from the frequency domain to the time domain to output processed video data 1107. The engine 1115 includes a perceptual model 1120 and an inverse perceptual model 1130, and the engine 1115 interacts with the applications 1145, 1150, 1155.

In some embodiments, the upgradable engine can be used with a video decoder and an audio coder. In some embodiments, the video data may be used with the engine for processing, and may be transported in video by sending data in between video frames. The type of frames may also determine if data is sent in between video frames.

Engine Framework

Figure 12:
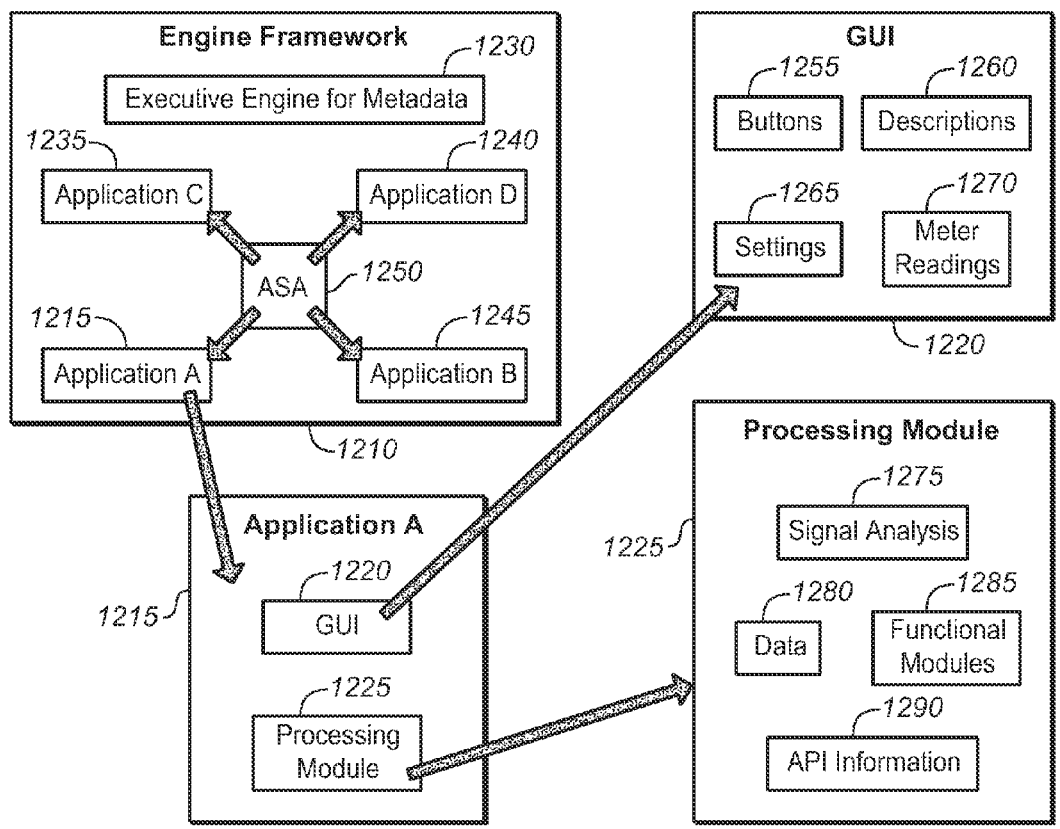
FIG. 12 depicts an example of an engine framework.

FIG. 12 depicts an example of an engine framework 1210. The engine framework includes an executive engine for metadata 1230, audio and/or video processing applications (e.g., Application A 1215, Application B 1245, Application C 1235, and Application D 1240), and an audio signal analysis (ASA) module 1250.

The engine framework 1210 can generate and maintain information and statistics regarding installed and/or used applications for A/V electronic equipment, as well as information and statistics for the users of the A/V electronic equipment. The engine framework 1210 may also receive and notify users of updates to their A/V electronic equipment and provide for improved performance. The engine framework 1210 can assess the data or fingerprints of audio (or video) data to identify the contents of the audio (or video) data, and use this information to improve the sound (or image). For example, the audio may be from an old recording (or the video can be from an old movie), and the engine framework 1210 can know which applications to use or install to improve the sound (or picture quality).

The executive engine for metadata 1230 coordinates various metadata used in the engine framework 1210. The metadata may provide information regarding the audiovisual components in a home theatre. For example, the user's A/V system may be a five-year-old plasma TV manufactured by a first electronic equipment manufacturer, connected with a three-year-old A/V receiver by a second electronic equipment manufacturer, a six-month-old DVD player by a third electronic equipment manufacturer, a one-year old video game system for a fourth electronic equipment manufacturer, and a two-year old set of speakers by a fifth electronic equipment manufacturer. The metadata may include information regarding the characteristics of these components (e.g., their age, how the components' operation varies with age, their model, their performance specifications, their compatibility with other electronic equipment) set-up and operation of these components, as well as usage information about these components (e.g., how often they are used).

The metadata also may include information regarding the audio and/or video processing applications, such as, for example, customizable presets for the applications that depend on the specific components employed, their age, and/or the environment in which the components are employed or other factors. For example, some processing modules may accept two channels of audio data and create a 5.1 or larger number of channels. This type of module can be positioned first in line if the input is mono or stereo content and subsequent processing modules require multichannel audio input for processing, such as a surround virtualizer.

In some embodiments, some modules may create additional audio data with information about the content that can be used by other processing modules. This type of processing module should be placed at or near the front of the processing chain. For example, one processing module may extract the voice/dialog content from stereo inputs and create a three channel output (e.g., left, L, right, R and center, C (voice)), which could be useful to a downstream another component, such as a Dolby® Dialog Clarity component.

In some embodiments, the metadata also may include information regarding the user (e.g., biometric information, such as hearing and or vision loss), the environment in which the components are employed (e.g., sound or light properties of the environment), and/or information regarding the type of audio or video content, such as audio content from a CD or a DVD, and the nature and/or type of the content, such as music, movie, dialog, sports, indoor activities, or outdoor activities.

As described further below, the executive engine 1230 may coordinate and employ the metadata to control aspects of the installed applications, such as which applications are installed, their processing order, and or their settings. The executive engine 1230 may control the aspects of the applications, for example, to provide perceptually better audiovisual reproduction of content, to provide processing within the available resources, or to minimize the processing resources required.

In some embodiments, the metadata may be used in a boot-time configuration when the engine is first used and the system is activated, or in other embodiments, a run-time configuration and used whenever the engine is operating. The metadata may be in a number of formats, such as a binary data stream, an Extensible Markup Language (XML) file, encapsulated digital information. The metadata may be residing in the engine framework 1210, derived from another source over a network connection (e.g., metadata from the application developer), attached with the audio content, or generated as the system configuration or user profile is developed.

The Auditory Scene Analysis (ASA) module 1250 can be used for detailed signal analysis of the audio data. Auditory Scene Analysis can refer to a specific type of audio signal analysis that identifies perceptually relevant elements of the audio that, when known, can result in significantly higher quality audio post-processing. For example, the ASA module inherent in Dolby® Volume may identify those elements of the audio for which level changes are inappropriate, such as sustained musical notes with decays. This is one example of many various auditory scene elements that can be detected and used to provide high quality post-processing. The ASA module 1250 can perform audio analysis and provide information about the audio signal that may be utilized by a number of applications, and also can be used as a shared resource between various applications, similar to the signal representations in FIG. 9. In some embodiments, the ASA module 1250 may have features that differ from the processing features of the applications 1215, 1235, 1240, 1245, such as complex signal analysis.

Each of the applications may have separate functionality for a graphical user interface (GUI) and the underlying processing modules for that application, which implement the audio and/or video processing for that application. For example, Application A 1215 has a GUI 1220 to represent the application on a TV monitor in real-time, and also has a processing module 1225 for the engine framework 1210. The GUI 1220 may be shown in the TV monitor and may have buttons 1255 for a user to select or deselect features of the application 1215, descriptions 1260 to the user to explain the purpose and function of the application 1215, settings 1265 that may be configured for particular electronic equipment and users, and meter readings 1270 to show a measurement related to an audio or video quality. In some embodiments, the GUI 1220 for the application can be common to the overall GUI 200 for the system framework, as in FIG. 2. In this aspect, the GUI 1220 for an application may have a design and layout that is similar the GUI of other applications, in which buttons and descriptions may have a similar layout. In other applications, the format and layout of the meter readings may vary, such as the meter readings for volume, frequency response, power, noise, peak responses, average volume level, and other readings for one or more audio channels.

The processing module 1225 for the application 1215 may include data 1280, signal analysis 1275, internal functional modules 1285, and API information 1290. The data 1280 may include audio data and metadata, as well as data for the settings 1265, the meter readings 1270, equipment and application usage information, user data, and data for manufacturer specifications of the electronic equipment. The processing module 1225 can use its own internal functional modules 1285, such as an application having a first functional module for audio for film, a second functional module for audio for broadcast television, a third functional module for DVDs, and other functional modules for other types of audio. Because the processes can reuse much of the software and algorithms from the engine framework 1210 through a standard API, each processing module 1225 may have API information 1290 for its application 1215. In some embodiments, the ASA 1250 in the engine may perform the signal analysis, and in other embodiments, the processing module 1225 for the application 1215 can perform the signal analysis.

Processing Order

In some embodiments, the processing order (e.g., the order of processing modules in a chain) can be important for proper overall system performance, and for the reduction of system resources and memory. Downloadable metadata can help to control the hierarchy and processing order of the engine and/or its applications/processing modules. In some embodiments, the downloaded applications may also use security features when they are downloaded, such as handshaking, encryption, verification, and authentication.

Figure 13:
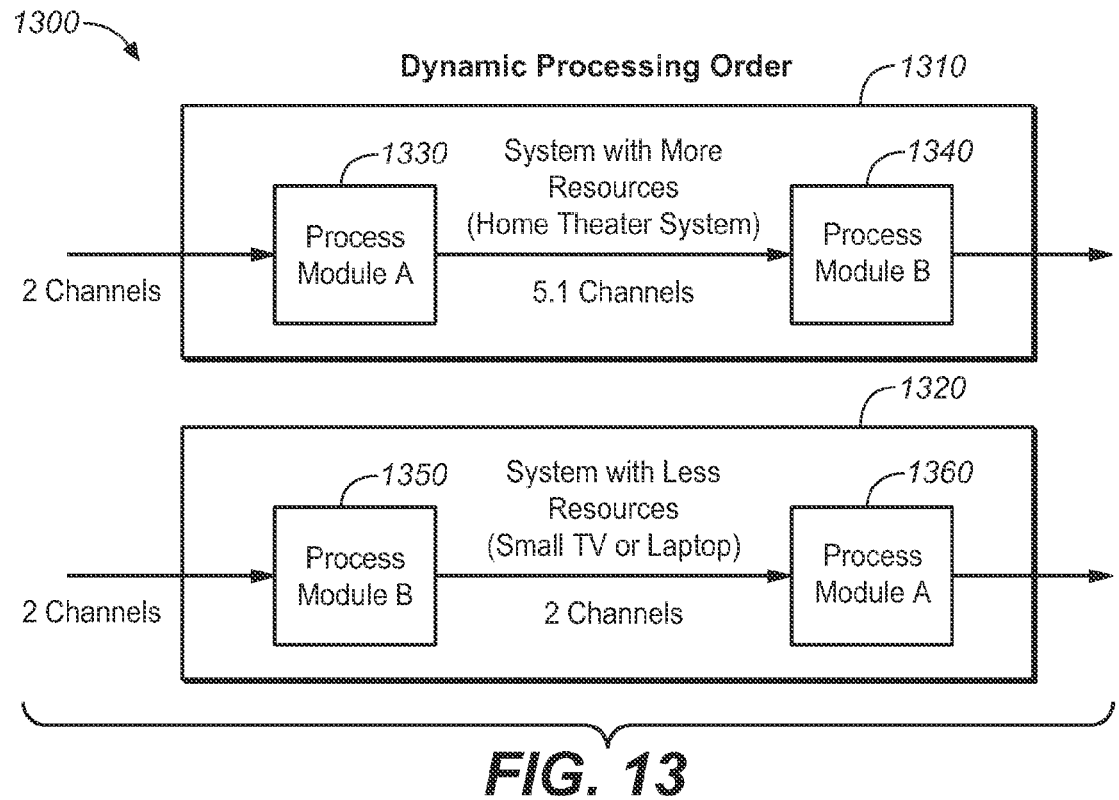
FIG. 13 depicts an example of a system that includes two different processing chains.

FIG. 13 depicts an example of a system 1300 that includes two different processing chains 1310 and 1320. An order of dynamic processing or chain may refer to an order for at least two processing modules that can be arranged and/or changed by the user, the engine, or some application to enhance performance and/or reduce processing and/or memory requirements. In the first processing chain 1310, in which a two-channel speaker system that has an adequate amount of processing resources for a home theater system is upgraded to a virtual 5.1 channel speaker system, the processing module for process module A 1330 (e.g., such as for Dolby® Pro Logic IIx) can proceed a processing module for process module B (e.g., such as for Dolby® Volume 1340) in the processing chain 1310. The processing module for process module A 1330 can provide a surround sound experience from any stereo (two-channel), 5.1, or 6.1 channel movie, music, TV, or game audio source and expand the audio up to 7.1 channels of realistic, natural surround sound. After the processing module for process module A 1330 is used in the processing chain 1330, the processing module for process module B 1340 can address any volume variations in the 5.1 channel configuration.

In a second processing chain 1320, a system may have more limited resources for its A/V configuration and/or processing resources, such as a small TV or laptop computer. In the second processing chain 1320, the system may only have the ability to have a maximum of two inputs and output channels for the speakers with a limited audio range. For this embodiment, the processing module for process module B 1350 (e.g., such as for Dolby® Volume) can proceed the processing module for process module A 1360 (e.g., such as for Dolby® Pro Logic II) so that the processing module for process module B 1350 can address volume variations before the processing module for process module A 1360 provides (a virtualized) surround sound for the two channels of speakers. In some embodiments, the processing order can have a higher number of processing modules than are shown in FIG. 13, and the type and order of those processing modules can vary and/or depend on a number of factors.

Figure 14:
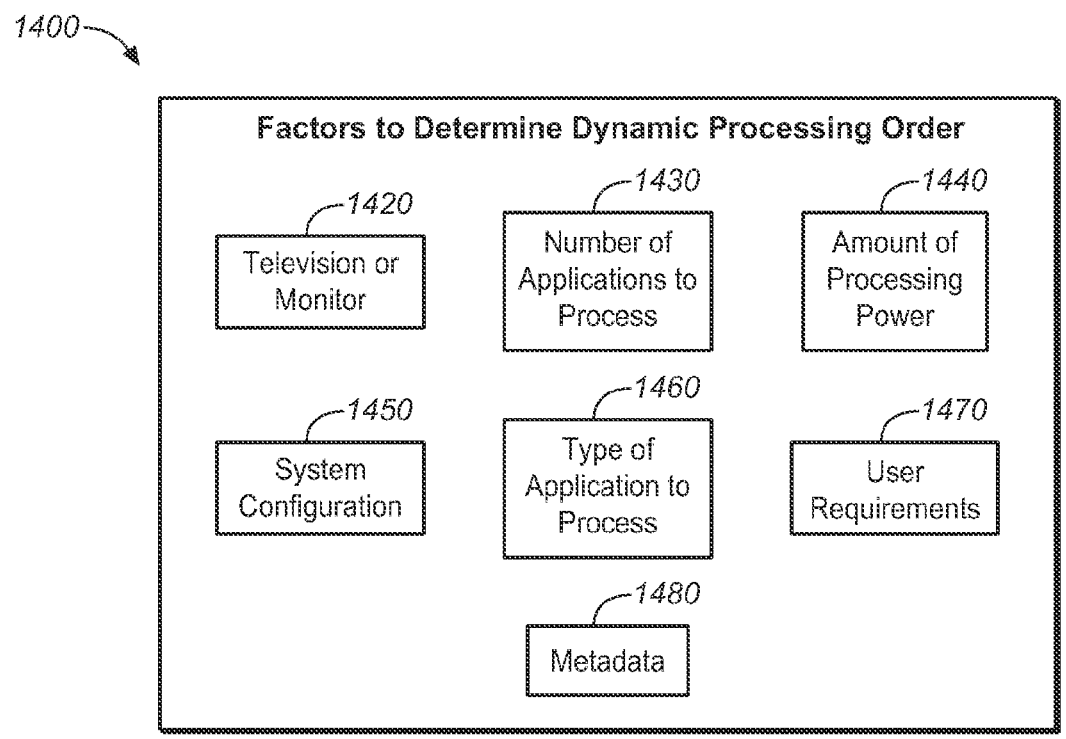
FIG. 14 depicts an example of factors used to determine a processing order.

FIG. 14 depicts an example of factors 1400 used to determine a processing order. The processing order can depend on a number of factors, such as a type, age, specification, and/or condition of a television or video monitor 1420 or other components, the system configuration 1450 (e.g., a laptop, television, audio system, home theater system), a number of applications to process 1430, a type of application to process 1460, and/or user requirements and specifications 1470. The processing order also can be dynamic in that it can depend on an amount of available processing power 1440, available system resources (e.g., amount of processing capability or memory), a level of quality or performance of the system (e.g., a small office audio system or a large multi-channel audio system), or an output configuration (e.g., a number of speakers, a type of speakers, a number of active speakers, or the connections between the A/V electronic equipment). In some embodiments, the processing order can be dynamic based on the type of content and the processing required. For example, a dynamic reordering of the modules may be triggered based on whether the input audio is stereo or multi-channel audio. Also, if the type of content changes (e.g., from music to news) some additional processing modules may be inserted while others processing modules may be removed. For example, for news content a processing module that provides voice clarity may be added, while that voice-enhancement processing module may not likely be used for music content.

The processing order for processing modules of applications can also be determined by downloadable metadata (1480). Downloadable metadata can include information pertaining to newly-released algorithms, which may require different processing orders than previously used. For example, a new algorithm C may operate best between previous algorithms A and B, which were previously ordered one after the other. The metadata can have information to arrange the processing order for the processing modules of applications. The processing order may also depend on the type of content (e.g., DVD, radio, TV, CD, MP3), and the type of audio (e.g., voice, music, television audio, movie audio).

The processing order also can be configured dynamically in that new processing modules for new applications can be added to any point in a processing chain. For example, a new processing module can be added between the processing module for Dolby® Pro Logic IIx 1330 and the processing module for Dolby® Volume 1340 in the processing chain 1310 of FIG. 13. The user may also have the option to determine or change the processing order based on user input with a GUI.

In some embodiments, there can be a hierarchy for particular system configurations that can provide for the sharing of processing resources. The hierarchy can have levels based on an amount of processing modules in the processing chain and/or the types of processing modules in the processing chain, where each level may require a certain amount of processing resources. In some embodiments, the hierarchy may represent the allowable chain of processing modules, and the processing order may refer to the chain of processing. The allowable chain of processing may represent a chain of processing that is permissible for a particular system configuration, in which some processing modules may not be able to be used in or inserted into particular points in some processing chains. In other embodiments, the hierarchy can represent a preferred processing order for a given system configuration. For these embodiments, for example, the engine can determine a preferred processing order based on the type of electronic equipment in the system and the user preferences. In one example, this determination of the preferred processing order may be based on communicating information with a database over the Internet to the application developer, where the application developer can provide a solution for resource sharing based on a number of factors.

As an example of a hierarchy, the first or second dynamic processing orders 1310, 1320 shown in FIG. 13 may represent a two-level hierarchy (for two processing modules).

Figure 15:
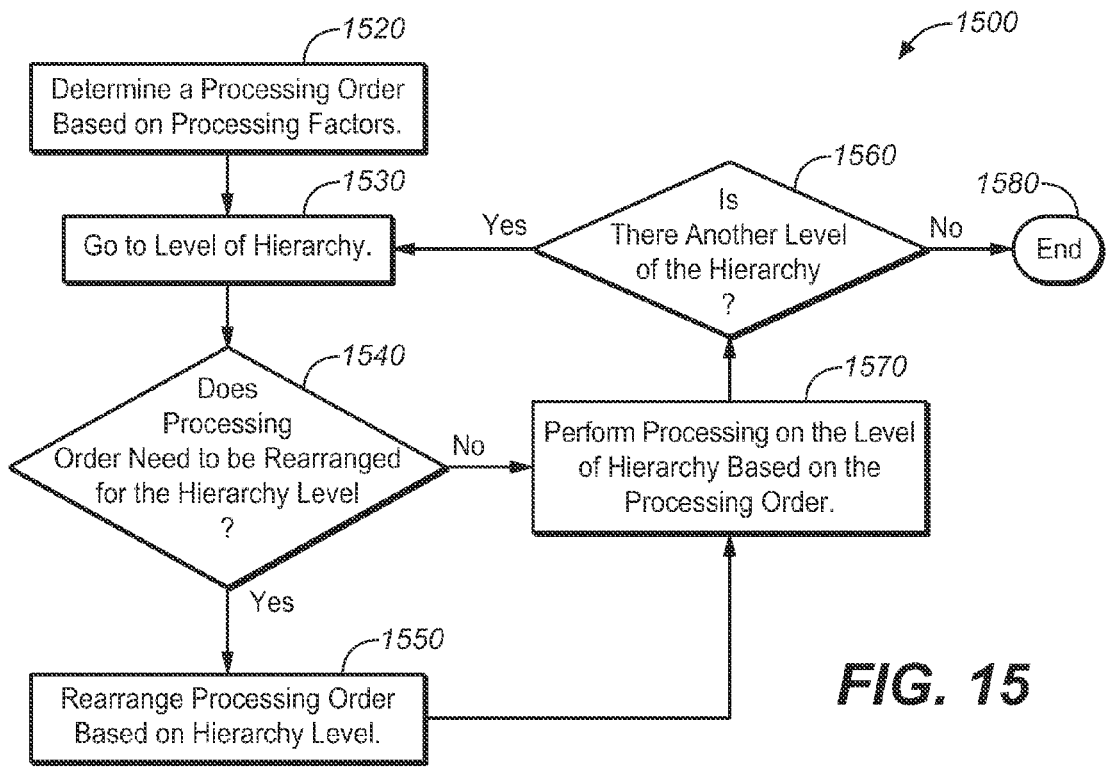
FIG. 15 depicts an example of a flow diagram for a process for determining a processing order.

FIG. 15 depicts an example of a flow diagram for a process 1500 for determining a processing order. The processing order can be determined based on a number of factors (1520), as discussed in FIG. 14. At a level of the hierarchy (1530), a determination can be made if the processing order needs to be rearranged for the processing module of the hierarchy level with other hierarchy levels to achieve a certain level of quality, resource sharing, or processing cost (1540). If so, the processing order of the processing modules in the hierarchy should be rearranged for that hierarchy level (1550), and the processing should be performed based on the rearranged processing order (1570) with the other hierarchy levels. If the processing order does not need to be rearranged to achieve a certain level of quality, resource sharing, or processing cost (1540), then processing should be performed based on the existing processing order (1570) and no rearrangements of hierarchy levels need to be made. After the processing is performed (1570) for the processing module of that hierarchy level, there is a determination of whether there is another level of the hierarchy to evaluate for the resources or quality of the system. If not, then the evaluations of the processing order for the system terminate. If there is another level of the hierarchy to evaluate, the system goes to that next level of hierarchy (1530) and determines if the processing order needs to be rearranged for that hierarchy level and other hierarchy levels to achieve a certain level of quality or resource sharing (1540).

Figure 16:
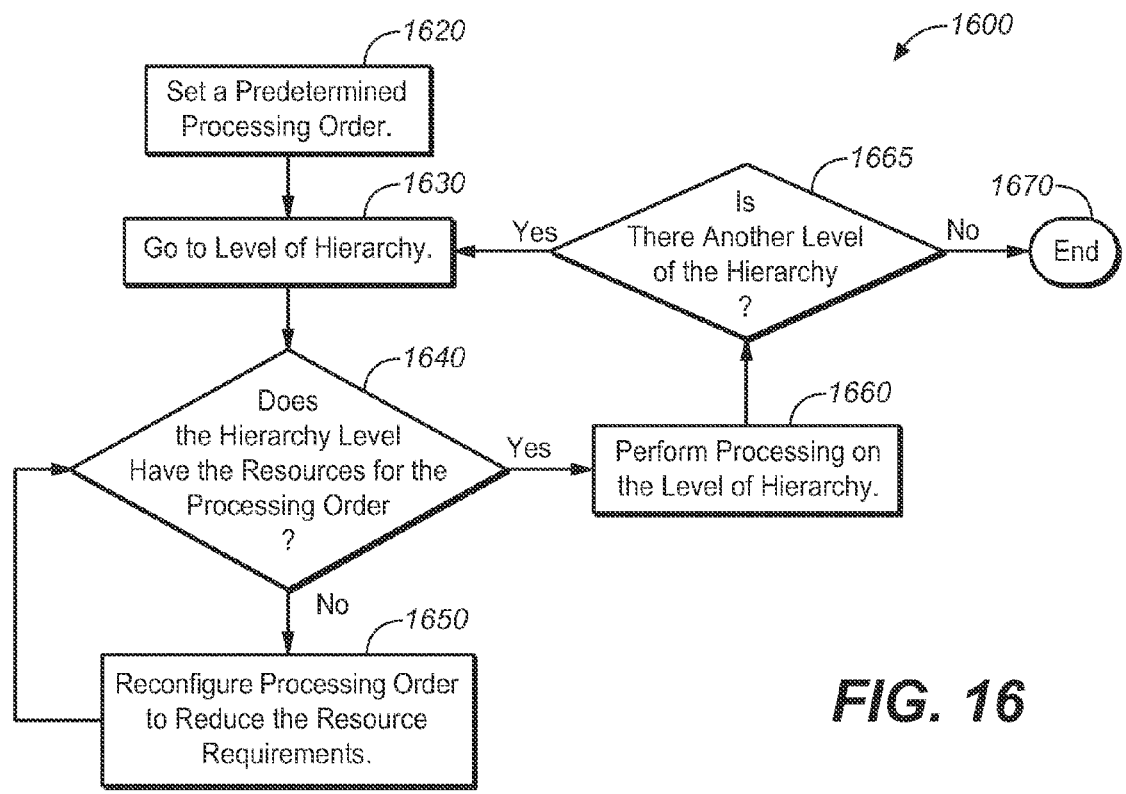
FIG. 16 depicts an example of a flow diagram for a process for determining a processing order.

FIG. 16 depicts an example of a flow diagram for a process 1600 for determining a processing order 1600. The processing order may be set based on a predetermined processing order (1620). The predetermined processing order may be a general initial processing order based on a recommended or a default processing scheme (e.g., a processing order for a 2-channel stereo system that does not have large processing resources available). In the hierarchal processing order 1600, a level of the hierarchy (1630) is evaluated to determine if the system has the resources for the processing module(s) in the level of the hierarchy (1640). If the resource requirement of the level of the hierarchy cannot be met (1640), then the processing order of the processing modules is rearranged to lower the processing requirements for that level of the hierarchy (1650). In some embodiments, the rearrangement may lead to a re-ordering of existing processing modules in the processing chain. In other embodiments, the rearrangement may mean substituting different types of processing modules in the processing chain. If the resource requirement of the level of the hierarchy can be met (1640), then processing is performed on that level of the hierarchy (1660). If there is another level of the hierarchy to evaluate (1665), then the system repeats similar operations for that level of the hierarchy. Otherwise, the evaluations end if there are no more levels of the hierarchy to evaluate (1670).

Instead of or in addition to determining the processing order based on resources, as in FIG. 16, the processing order can be determined based on other considerations, such as a quality of audio for a particular A/V system configuration. The processing order may also change if new applications are to be used and their processing modules need to be inserted into a particular position in the processing chain for best performance or quality. In some embodiments, some processing modules can be processed in parallel in the same level of the hierarchy. For example, a first and a second processing module can be processed in parallel a first level of a hierarchy, and a third processing module can be processed in a second level of the hierarchy.

Device and User Analysis

Figures 17, 18:
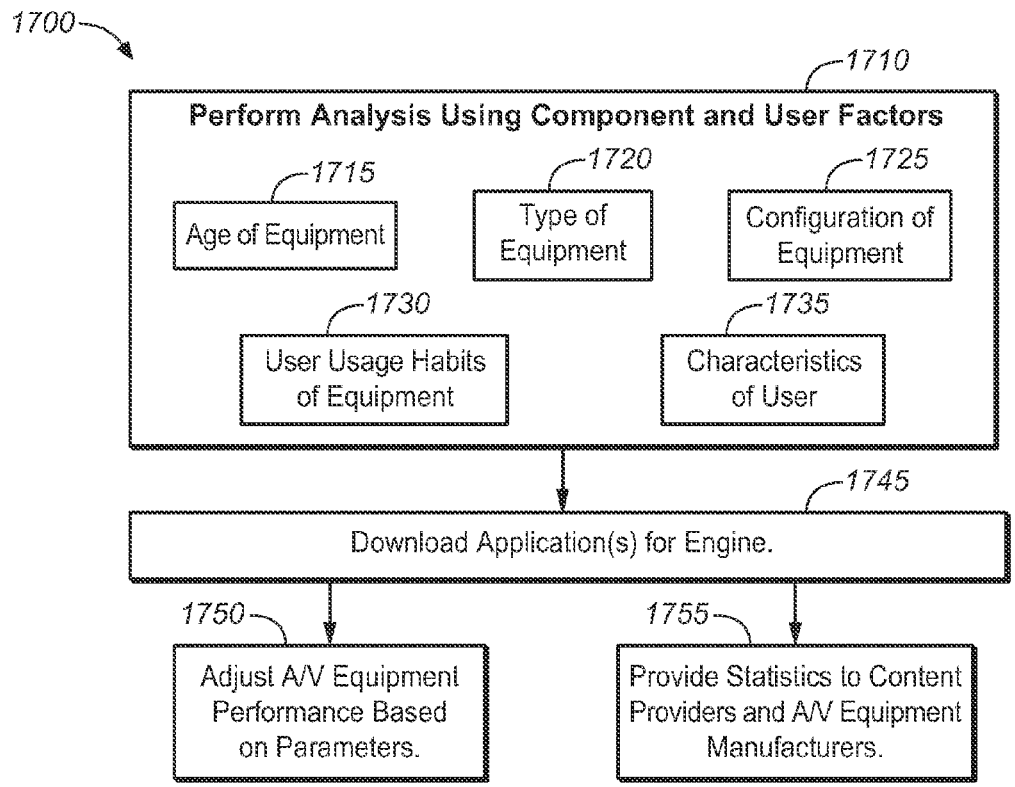
FIG. 17 depicts an example of a flow diagram of a process for adjusting device performance and providing statistics based on device and user factors.
FIG. 18 depicts an example of a sensory system for an audio engine and a video engine.

FIG. 17 depicts an example of a flow diagram of a process 1700 for adjusting device performance and providing statistics based on A/V equipment and user factors. An analysis using A/V equipment and user parameters is performed (1710) with any number of factors. For example, the age of the A/V equipment may be tracked (1715) to determine performance and equipment degradation over time, and how additional applications can be downloaded to improve performance and/or to compensate for age-related performance loss. This information may be available, for example, from the A/V equipment manufacturer and/or their customers (e.g., customer feedback, resells). The type of A/V equipment also can be considered in gathering and evaluating data on the model number and performance specifications of the A/V equipment (1720). This information, for example, may be determined by and gathered from the manufacturer of the A/V equipment.

The configuration of the A/V equipment also may be considered in the analysis (1725). The configuration may involve how the A/V equipment is configured with respect to other A/V equipment in the system. The configuration may also involve having information on the input and output configuration, such as a large screen liquid crystal display (LCD) television with five HDMI inputs, 2.1 speakers, two component A/V port connections, two composite A/V port connections, and three S-video port connections. The configuration may also involve the physical aspects of the A/V equipment, such as wall-mountable speakers with a thickness of less than five inches and limited audio capabilities.

The usage habits of the A/V equipment may also be a factor (1730). For example, if the A/V equipment is an often-used Blu-ray™ disc player, then applications may be downloaded for high quality audio and video performance. The characteristics of the user of the A/V equipment also are considered in the analysis (1735). For example, a user profile may provide information about what type of content the user prefers or the type of audio set-up the user prefers. For example, the user may have a preference to listen to a particular type of music with a specified frequency response for multiple channels of speakers. The hearing and visual characteristics of the user may also be considered, such as receiving information about the hearing capabilities of the user and using that information to develop an audio profile for the user to download specific applications to enhance the user's hearing.

After the factors are considered, applications are selected based on the factors and downloaded to be used with the engine (1745). In addition, the factors can be used to adjust the settings of the downloaded applications. The applications can be built-into and sold with the original hardware system, and the performance of the A/V electronic equipment can be enhanced based on one or more factors (1750), such as the factors in FIG. 14. When the applications are integrated, the processing chain may be formed or adjusted to provide for resource sharing and/or improved performance. When the applications are downloaded (1745), information can also be sent over the Internet to the content providers (e.g., music company, movie studio, television station) and/or the A/V equipment manufacturers to allow them to enhance future products and services, as well as to develop effective promotions and advertisements to targeted customer groups (1755).

FIG. 18 depicts an example of a sensory system 1800 for an audio engine 1850 and a video engine 1870. In some embodiments, user input and environmental conditions can be used to determine applications for downloading to use with the engines 1850 and 1870 and/or settings for the applications used with the engines 1850 and 1870. The user input may be biometric information, and the environmental conditions may be the light and sound that may be present in the reproduction environment that contains the A/V equipment that is being used by the user. In this embodiment, the A/V equipment detects sound 1830 with an audio sensor 1825 that interacts with an audio system 1820. The A/V equipment also detects light 1830 with a light sensor 1835 that interacts with a video system 1840. The audio system 1820 may be connected with the audio sensor 1825 and the video system 1840 may be connected with the light sensor 1840 through a wired or wireless connection. The audio system 1820 and video system 1840 may have one or more of the components, as shown in the example of FIG. 1.

In some embodiments, the audio sensor 1825 may be located in proximity of the audio system 1820, and the light sensor 1835 may be located in proximity of the video system 1840 so that a user listening to audio or watching video can experience the added features of the downloaded applications. In some embodiments, the sensors 1825, 1835 can be located in proximity to the A/V equipment user, and the systems 1820, 1840 may not be located in proximity to the A/V equipment user. For example, the sensors 1825, 1835 may be located near a LCD television and speakers, and some processing equipment for the audio system 1820 and video system 1840 may be in another room. The audio engine 1850 and/or video engine 1870 may facilitate downloading applications for use.

The audio system 1820 interacts with the audio engine 1850, which uses processes for an audio application 1855 and audio settings 1860, such as tuner and frequency response settings. The audio application can be, for example, an application for Dolby® Volume, or some other downloadable audio application to be used with the audio engine 1850.

The video system 1840 interacts with the video engine 1870, which uses processes for a video application 1875 and video settings 1880, such as resolution and video setup settings for the A/V equipment. The video application 1875 can be, for example, an application for some downloadable video application for the video engine 1870. One video application (e.g., Dolby® Contrast) can be for a video application for improving the picture quality of LCD televisions by employing LED backlighting and other techniques to locally dim backlight areas to match the brightness of the image. A second video application, (e.g., Dolby® Contrast) can enable LCD televisions to display true blacks and lifelike dynamic contrast while consuming less power. A third video application (e.g., Dolby® 3D Digital Cinema) can be for a video application that allows the user to experience a three-dimensional experience with sharp, clear images.

In some embodiments, the light sensor 1835 (e.g., a photosensor) can be used to detect whether a room is light or dark (e.g., daytime, nighttime, bright, dim), and that information can be used to adjust the video settings, order of the processing chain, and/or type and number of downloaded video applications. In other embodiments, the audio sensor 1825 can be used to detect sound and noise, and may be used to create an audio profile for a room, automobile, or airplane. The audio profile may be used by the downloadable audio applications to improve the sound of the A/V equipment and to improve the quality of the sound of the content going to certain audio channels and speakers. In one example, the volume of certain audio speakers can be adjusted based on the noise in the room or the sound of people talking in the room. A video profile may also be created based on the lighting and visual conditions of the viewing area. The audio (or video) profile may be stored in the audio system 1820 (or video system 1840), a local personal computer, a memory location (e.g., memory on a cable TV box), or shared with the application developer, A/V equipment manufacturer, or content provider.

Applications can also be downloaded based on biometric characteristics of the user. For example, the A/V equipment user may use their personal computer to create a hearing profile that can test and model the hearing abilities of the user. Applications can be downloaded to correct for hearing loss, as well as the loss of hearing at certain frequencies. The user may also get their hearing profile from hearing tests performed by an audiologist (e.g., a healthcare professional specializing in the auditory senses). The hearing profile of the user can be stored on a memory device and can be used with the downloadable applications and engine to improve their hearing of sound from the speakers. There can be other profiles with information on the user, such a user profile with the age of the user and the preferred audio and video content of the user. Information can be tracked and stored in a user profile on how often the user uses certain settings, the time of day they use those settings, the type of A/V electronic equipment that is used (e.g., a DVD player or a video player), the type and usage of the downloaded applications. Statistics on the user and the user's habits (e.g., how often an application is invoked) can also be maintained in the user profile. The user profile can be stored in a database, may be part of the engine framework 1210 of FIG. 12, and may be part of a user account. There can be different user profiles for different users of the A/V electronic equipment.

There can be profiles that include information for the A/V electronic equipment. For example, the A/V electronic equipment may have customizable presets based on the type of A/V electronic equipment being used (e.g., equalization presets for particular types and brands of televisions, speakers, etc.), and there can be presets that are determined and/or based on the age of the A/V equipment that takes into account how the performance of the A/V equipment degrades over time (e.g., color correcting a plasma television that loses color saturation over time).

Figure 19:
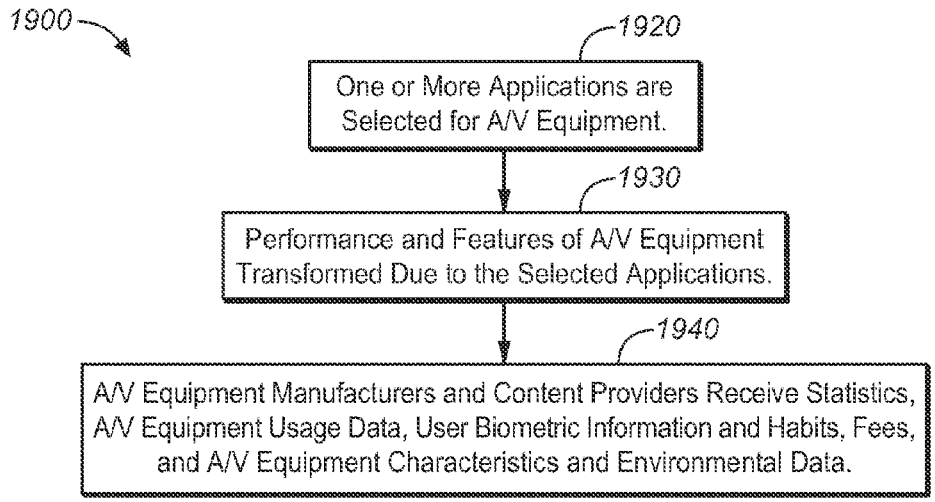
FIG. 19 depicts an example of a flowchart of a process for providing statistics based on device characteristics and environmental data.

FIG. 19 depicts an example of a flowchart of a process 1900 for providing statistics based on device characteristics and environmental data. One or more applications are selected for the A/V equipment (1920). The selection of the application from the application developer or provider may be performed, for example, by the user (using, for example, the GUI and the Internet, as in FIG. 1, 3, or 19) or the engine. The performance and features of the A/V equipment is transformed due to the selected applications (1930). The selected applications may also transform the A/V electronic equipment in that the A/V electronic equipment can have better or different performance and features than when the A/V electronic equipment was manufactured. Any of the profiles (e.g., user profile, A/V equipment profile, audio and video profiles, etc.) can be uploaded via a network or the Internet and provided to the A/V equipment manufacturers and the content providers to allow them to have user, usage, and A/V equipment data to modify their future services and products, as well as to provide targeted advertisements to potential customers (1940). The A/V equipment manufacturer and content providers can also receive biometric information, user habits, fees, A/V equipment characteristics, and environmental data (1940).

Figure 20:
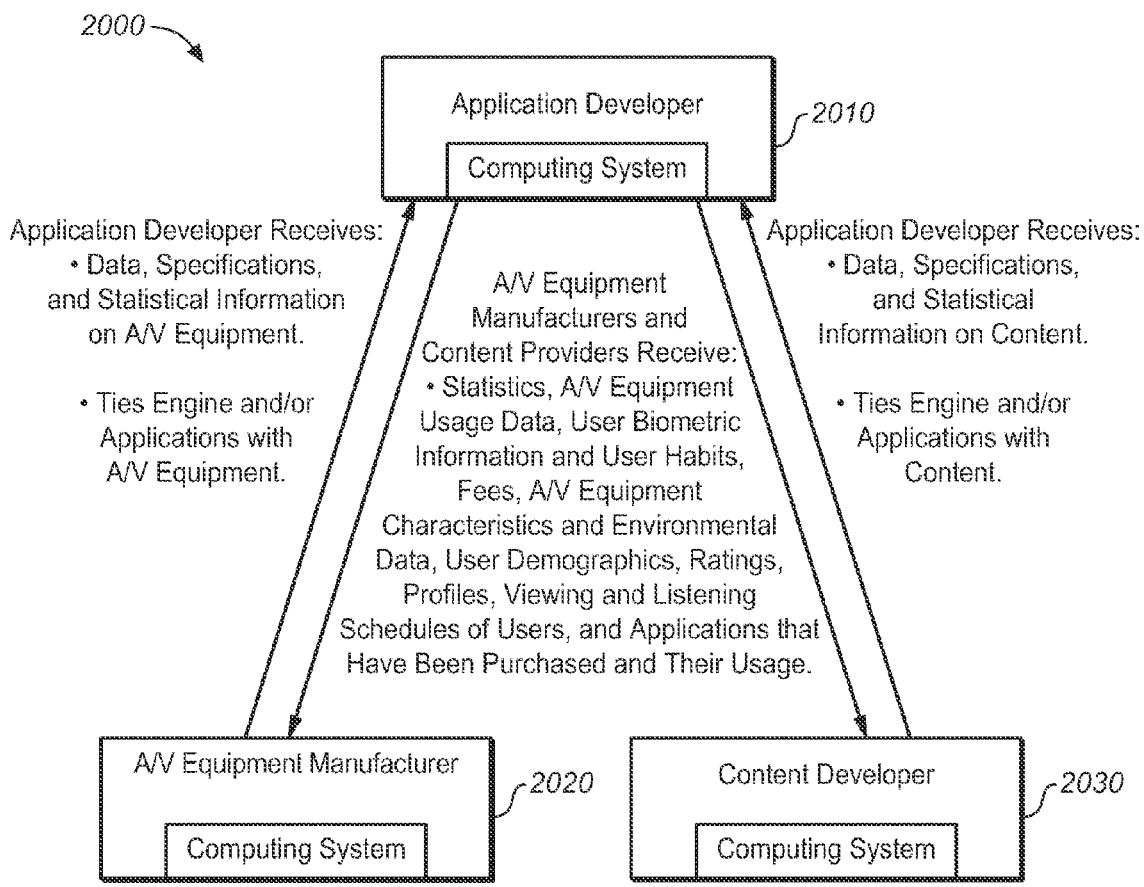
FIG. 20 depicts an example of a diagram showing a relationship among an application provider/developer, an A/V equipment manufacturer, and a content provider.

FIG. 20 depicts an example of a diagram showing a relationship 2000 among an application developer 2010, an A/V equipment manufacturer 2020, and a content provider 2030. The application developer may be the entity that develops the applications. The A/V equipment manufacturer may be the entity the makes and/or designs the A/V electronic equipment. The application provider may be the entity that provides the application to the user. The content developer may be the entity that makes the content to play on the A/V electronic equipment, such as the audio and/or video for music, movies, television programs, etc. The content provider 2030 may be the entity that provides the content to the A/V user for use on the A/V equipment. In some embodiments, the application developer 2010 may be the same entity as the application provider, and the content provider 2030 may be the same entity as the content developer. The application developer can send user biometric information and habits, fees, and A/V electronic equipment characteristics, and environmental data to the A/V equipment manufacturers 2020 and the content providers. In some embodiments, the application developer can send this information through the use of an embedded application in the A/V electronic equipment. The data from the application developer 2010 can provide the A/V equipment manufacturers 2020 and the content providers 2030 with information for a type of rating system for A/V electronic equipment, audience sizes for programming and content, demographics of users of certain A/V electronic equipment, and user habits, the content of what users listen and watch, statistical information for targeting audiences and markets, user viewing and listening schedules, and the additional applications that users want installed in their existing A/V electronic equipment. In some embodiments, the rating system may be based on the popularity of the content with one or more other users of the content. The information for the user habits may include the application presets that are used by a user, and the types of content that is used by the user, along with the application presets for certain types of content. Information may also include how often an application is used by a user to determine the popularity of the application in the field of use. The information and data for the user and the A/V electronic equipment may also serve for testing new products and services, and may provide insight that is more refined and dynamic than the results of a user survey.

The application developer can receive specific information on products that may not be publicly available, such as data regarding the performance of the A/V electronic equipment over time, and any malfunctions, recalls, or incompatibilities with other equipment. Also, the content providers can promote the applications of the application developer by placing advertisements and promotions with their content (e.g., bundle or tie the software for the upgradeable engine and/or applications with content, such as movies, television shows, video clips, or audio content). For example, an advertisement can be displayed before a movie on a DVD or Blu-ray™ disc to inform consumers that they can purchase an application from the application developer for an enhanced viewing or listening experience of the content on their system. For example, the content can be created with enhanced playback enabled by a particular type of application, such as a 3D application for video.

Regarding the fee information, when a customer purchases an application, part of the profits of the purchase can be sent from the application developer or provider to the A/V equipment manufacturers and/or the content providers/developers. The payment the application developer makes to the A/V equipment manufacturers and the content providers can reward those entities for encouraging the commercialization and distribution of the software for the upgradeable engine and applications with their A/V electronic equipment and A/V content. Fee information and revenue can also be shared by the application developer with the A/V equipment manufacturers who host or port the upgradeable engine (and maybe some applications) from the application developer on their A/V electronic equipment. For example, the A/V equipment manufacturers can bundle or tie the upgradeable engine with the A/V electronic equipment when the A/V electronic equipment is manufactured or sold.

In some embodiments, the amount of the fee can be based on an actual or estimated number of consumer purchases of applications, and in other embodiments the fee can be determined based on information and/or statistics that are shared between the entities. The fee information may refer to information related to a monetary exchange, a payment, an obligation or promise to make a payment, a royalty rate or agreement, a licensing arrangement, or a bargained for exchange for a performance by at least one of the entities.

In some embodiments, other consideration can be sent from the application developer or provider to the A/V equipment manufacturers and/or the content providers/developers. In some embodiments, the content provider/developer can market/advertise the applications of the application developer/provider with the content, and the application developer/provider can promote and/or market/advertise various types of content from the content provider/developer when the applications are used or being purchased by the user. The advertisements to promote the applications of the application developer may include graphics, video, and/or audio, and can be played on the A/V equipment of the A/V user. As described in the example embodiments and systems, the data, statistics, instructions, processing modules, advertisements, A/V content, and/or fee/fee information sent amongst the A/V user, application developer/providers, A/V equipment manufacturers, and/or the content providers/developers can be transmitted, transformed, and/or processed with computers and computing systems associated with each of the entities.

Example Systems

The techniques can be used on one or more computers. One or more methods (e.g., algorithms and/or processes) herein can be implemented with, tied with, employed on, and/or have data transformed with computers and/or video/audio display, transmission, processing apparatuses, and playback systems. The computers described herein may be any kind of computer, either general purpose, or some specific purpose computer such as a workstation. The computer (e.g., 130 in FIG. 1) may be, e.g., an Intel or AMD based computer, running Windows XP™, Vista™, or Linux™, or may be a Macintosh computer. An embodiment may relate to, e.g., a handheld computer, such as a PDA, cell phone, or laptop. The computer may also refer to machines or parts of a machine for image recording or reception, processing, storage, and distribution of data, in particular video or audio data.

Any combination of the embodiments described herein may be part of a video system and/or audio system and its components. Any combination of the embodiments may be implemented in hardware and/or software. For example, any of the embodiments may be implemented with a computer program. In some instances, the embodiments may be directed to a particular types of data, such as video data or audio data.

Computer and/or graphic programs may be written in C or Python, or Java, Brew or any other programming language. The programs may be resident on a storage medium, e.g., magnetic or optical, e.g., the computer hard drive, a removable disk or media such as a memory stick or SD media, wired or wireless network based or Bluetooth-based (or other) Network Attached Storage (NAS), or other fixed or removable medium. The programs may also be run over a network, for example, with a server or other machine sending communications to the local machine, which allows the local machine to carry out the operations described herein. The network may include a storage area network (SAN).

Although only a few embodiments have been described in detail above, other embodiments are possible. It should be appreciated that embodiments may encompass equivalents and substitutes for one or more of the example techniques described herein. The present specification describes specific examples to accomplish a more general goal in another way. This description should be understood to represent example embodiments and the claims following are intended to cover any equivalent, modification or alternative.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a graphical system, a database management system, an operating system, or a combination of one or more of them.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows and figures described and depicted in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or another programmable logic device (PLD) such as a microcontroller, or an ASIC (application specific integrated circuit).

Processors suitable for the execution of a computer program include, by way of example, both general and special purpose microprocessors, and any one or more processors of any kind of digital computer. Generally, a processor can receive instructions and data from a read only memory or a random access memory or both. The essential elements of a computer are a processor for performing instructions and one or more memory devices for storing instructions and data. Generally, a computer can also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and discs for CD, DVD, and Blu-ray™ (BD). The processor and the memory can be supplemented by, or incorporated in, special purpose logic circuitry.

To provide for interaction with a user, some embodiments of the subject matter described in this specification can be implemented on a computer having a display device, e.g., a CRT (cathode ray tube), LCD (liquid crystal display), or plasma display monitor, for displaying information to the user and a keyboard and a selector, e.g., a pointing device, a mouse, or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Some embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an embodiment of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this disclosure contains many specifics, these should not be construed as limitations or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software or hardware product or packaged into multiple software or hardware products.

The term "algorithm" can refer to steps, methods, processes, schemes, procedures, operations, programs, guidelines, techniques, sequences, and/or a set of rules or instructions to achieve the results described herein. For example, an algorithm can be a set of audio and/or video processing instructions for a hardware and/or software video and/or audio processor. The disclosed algorithms (e.g., such as in the example figures and functional modules) can be related to and/or tied to video and/or audio, and can be generated, implemented, associated, and/or employed in video-related and/or audio-related systems and/or any devices, machines, hardware, and/or articles of manufacture for the transformation, processing, compression, storage, transmission, reception, testing, playback, calibration, display, and/or any improvement, in any combination, for video data and/or audio data.

Enumerated Example Embodiments

Embodiments of the present invention may relate to one or more example embodiments enumerated below.

1. A audio/video (A/V) system comprising: an audio/video (A/V) component configured to generate audio or video data; one or more processing devices configured to implement: an audio or video processing engine configured to process the audio or video data to generate one or more different domain representations of the audio or video data; and one or more audio or video processing applications that are each configured to access one or more of the different domain representations of the audio or video data and to perform audio or video processing on the one or more accessed domain representations of the audio or video data, wherein each of the one or more processing applications access and process the domain representations independently of each other.

2. The A/V system of enumerated example embodiment 1, wherein the one or more processing devices are further configured to download the one or more applications from a server.

3. The A/V system of enumerated example embodiment 1, wherein the one or more processing devices are further configured to present an interface for a user to select one or more of the applications for downloading.

4. The A/V system of enumerated example embodiment 1, wherein the one or more processing devices are configured to present an interface to an A/V user of the A/V component, the interface being configured to allow the A/V user to control settings for the one or more audio or video processing applications, wherein the interface comprises one or more panels for each audio or video processing application, wherein the one or more panels allow at least one of functions that comprises: a first panel to activate or de-active the application; a second panel to provide a description of the application to the A/V user; and a third panel to present the settings to the A/V user.

5. The A/V system of enumerated example embodiment 4, wherein each audio or video processing application comprises: a processing module to interact with the audio or video processing engine; and application data for the interface for presentation of control and description information for the application on the one or more panels.

6. The A/V system of enumerated example embodiment 4, wherein the interface is overlayed over at least an image of video content that is playing or playable in a background.

7. The A/V system of enumerated example embodiment 1, wherein the A/V system comprises a router coupled to the A/V component.

8. The A/V system of enumerated example embodiment 7, wherein the router includes one or more of the processing devices.

9. The A/V system of enumerated example embodiment 7, wherein a computer is coupled to the router and the computer includes one or more of the processing devices.

10. The A/V system of enumerated example embodiment 1, wherein the A/V component includes one or more of the processing devices.

11. The A/V system of enumerated example embodiment 1, wherein the A/V component comprises a video display, a digital video player, a television tuner, an audio-video receiver (AVR) system, a satellite receiver, or a cable television box.

12. The A/V system of enumerated example embodiment 1, wherein the domain representations comprise a frequency domain and a perceptual domain.

13. A method comprising: executing an audio or video processing engine configured to process audio or video data to generate one or more different domain representations of the audio or video data; and executing one or more audio or video processing applications configured to access one or more of the different domain representations of the audio or video data and to perform audio or video processing on the one or more accessed domain representations of the audio or video data.

14. The method of enumerated example embodiment 13, further comprising: downloading one of the audio or video processing applications from an application developer using a user account, wherein each downloadable audio or video processing application further comprises data for a graphical user interface (GUI) for presentation on an A/V component; and installing the downloaded audio or video processing application to be used with the engine.

15. The method of enumerated example embodiment 14, further comprising: using the GUI to receive a user input to adjust the performance of the A/V component; in response to the user input, adjusting the performance of the A/V component; and presenting a representation of the adjustment to the performance of the A/V component in the GUI.

16. The method of enumerated example embodiment 13, wherein the audio or video processing application comprises a processing module, wherein the method further comprises sharing processing resources when two or more processing modules are processed in a frequency domain with the engine, and wherein the sharing of processing resources comprises reuse of processes with the engine.

17. The method of enumerated example embodiment 16, wherein the processing in the frequency domain utilizing one or more transforms comprising a Fast Fourier Transform (FFT), a hybrid Quadrature Mirror Filter (QMF) bank, a discrete cosine transform (DCT), a modified discrete cosine transform (MDCT), a Quadrature Mirror Filter (QMF), a pseudo-quadrature mirror filter (PQMF), or a modified FFT representation.

18. The method of enumerated example embodiment 16, wherein the processing in the frequency domain utilizes a frequency domain representation of a decoder, wherein the processing in the frequency domain further utilizes a frequency-to-time domain transformation of the decoder.

19. The method of enumerated example embodiment 13, wherein the audio or video processing comprises: a transformation of the audio or video data from a time domain to a frequency domain; processing with the engine the transformed audio or video data with the two or more audio or video processing applications having processing modules in the frequency domain; and a transformation of the processed audio or video data from the frequency domain to the time domain.

20. The method of enumerated example embodiment 19, wherein at least one of the processing modules is configured for processing in the time domain and in the frequency domain.

21. The method of enumerated example embodiment 13, further comprising adjusting the performance of an A/V component by providing functionality for the A/V component in addition to the functionality of the A/V component at the time of manufacture, wherein the A/V component comprises a video display, a digital video player, a television tuner, an audio-video receiver (AVR) system, a satellite receiver, or a cable television box.

22. The method of enumerated example embodiment 13, further comprising adjusting an A/V component in regards to one or more factors, wherein the one or more factors comprises a setting of the A/V component, a usage history of the A/V component, a configuration of the A/V component, a resource sharing requirement for the A/V component, a performance requirement for the A/V component, an amount of processing resources, a level of quality of the A/V component, a type of content to be played on the A/V system, or a number of processing modules to process.

23. A audio/video (A/V) system comprising: one or more processing devices; one or more storage devices storing instructions that, when executed by the one or more processing devices, cause the one or more processing devices to implement: one or more audio or video processing applications for the A/V system, wherein each of the applications comprises a processing module and data for a graphical user interface (GUI) for presentation on the A/V system, wherein each application is configured to adjust a performance or a setting of the A/V equipment; an audio or video processing engine configured to interact with the processing modules for the applications, wherein the audio or video processing engine is configured to share processing resources among two or more of the processing modules.

24. The A/V system of enumerated example embodiment 23, wherein the audio or video processing engine comprises an audio signal analysis (ASA) module for signal analysis of audio or video data, wherein the ASA module is further configured for sharing processing resources among the applications.

25. The A/V system of enumerated example embodiment 23, further comprising metadata regarding the applications and the upgradable engine, wherein the metadata includes information regarding statistics associated with the engine, the applications, a user of the A/V system, characteristics of the A/V system, or characteristics of the user, wherein the engine is configured to manage the metadata.

26. The A/V system of enumerated example embodiment 25, wherein the characteristics of the A/V system comprises an age, a model, a performance specification, an amount of usage, a type of content used, a performance setting, an amount of processing resources, an input or output configuration, or a compatibility of the A/V equipment of the A/V system.

27. The A/V system of enumerated example embodiment 25, wherein the characteristics of the user comprises an age of the user, a habit of the user, a number of downloaded applications from the user, a type of downloaded applications from the user, or data from a profile of the user based on a user profile or a user account.

28. The A/V system of enumerated example embodiment 25, wherein the upgradable engine is configured to use at least one of the applications with the metadata for enhancing a quality of a sound or an image for the A/V system over the quality of the sound or the image when used without the application.

29. The A/V system of enumerated example embodiment 25, wherein the GUI comprises data to present: one or more buttons for selecting or de-selecting of the application; a description of a purpose or a function of the application; settings for configuring the A/V system; and a meter reading to present a measurement of a unit related to an audio or video quality.

30. The A/V system of enumerated example embodiment 29, wherein the GUI comprises data for each application to conform to a similar layout or design format, and wherein the processing modules share a common application programming interface (API).

31. The A/V system of enumerated example embodiment 25, wherein each of the processing modules for each application comprises A/V data, signal analysis modules, functional modules, and application programming interface (API) information.

32. The A/V system of enumerated example embodiment 23, wherein the applications comprise downloadable applications, and wherein the A/V system further comprises: a sound sensor coupled to the A/V system to detect sound conditions around the A/V system; and a light sensor coupled to the A/V system to detect light conditions around the A/V system, and wherein the upgradable engine is configured to manage downloaded applications and adjust the performance or the setting of the A/V equipment based on the light and sound conditions.

33. The A/V system of enumerated example embodiment 32, further comprising a user account that comprises information for the A/V user, the A/V system, and the downloaded and downloadable applications, wherein the GUI is configured to manage the information for the user account with the A/V user and an application developer, wherein the A/V system is configured to send statistics to the application developer over an Internet connection regarding the upgradable engine, the downloaded applications, the A/V user, characteristics of the A/V system, or characteristics of the A/V user.

34. The A/V system of enumerated example embodiment 32, wherein the A/V system is configured to use data for the light and sound conditions to download the downloadable applications and adjust the performance or the setting of the A/V equipment.

35. The A/V system of enumerated example embodiment 32, further comprising a light and sound profile for the light and sound conditions of the A/V equipment, wherein the light and sound profile is stored in one of the storage devices.

36. The A/V system of enumerated example embodiment 32, further comprising a biometric profile of the A/V user, wherein the A/V system is configured to further adjust the performance or the setting of the A/V equipment based on the biometric profile of the A/V user, wherein the biometric profile of the A/V user comprises at least a hearing profile of the A/V user.

37. A method comprising: accessing a plurality of processing modules for a plurality of downloadable applications, wherein each downloadable application comprises at least one processing module and data for a graphical user interface (GUI), and wherein each processing module is configured to interact with an upgradable engine to adjust a performance or a setting of an audio and video (A/V) equipment; and arranging an order of two or more of the processing modules in a processing chain to share processing resources, to reduce a processing requirement of the A/V equipment, or to enhance a level of performance of the A/V equipment.

38. The method of enumerated example embodiment 37, wherein the arranging of the order of the two or more processing modules comprises using metadata to control the processing order.

39. The method of enumerated example embodiment 38, wherein the metadata relates to a processing requirement or a level of performance.

40. The method of enumerated example embodiment 37, wherein the order of the processing modules comprises an order in which the processing modules are processed with the upgradable engine, wherein the processing order of the processing modules is dynamically adjustable based on one or more factors.

41. The method of enumerated example embodiment 40, wherein the one or more factors comprises a type, an age, a performance specification, or a condition of the A/V equipment, an input configuration or output configuration on the A/V equipment, an amount of available processing resources, a number of processing modules to process, a type of processing module, user requirements, a level of a quality of the A/V equipment, a type of content to be played by the A/V equipment, a processing module to add to the processing chain, user input, information from a user profile, a usage history of the A/V equipment, a predefined processing order for a processing chain, or information downloaded from an application developer.

42. The method of enumerated example embodiment 37, wherein the arranging the order of two or more of the processing modules is based upon a predefined processing order for a configuration of the A/V equipment, wherein the predefined processing order is downloaded from an application developer.

43. The method of enumerated example embodiment 37, wherein the arranging the order of two or more of the processing modules comprises: assigning each of the processing modules to a level of a hierarchy of a processing chain; for each level of the hierarchy, evaluating a processing cost or a processing resource requirement to determine if the processing cost or the processing resource requirement is lower if the processing module in that level is rearranged into another level of the hierarchy; and if the processing cost or the processing resource requirement is lower if the processing module is positioned in the other level of the hierarchy, then rearranging the order of the hierarchy to position the processing module in the level that produces the lower processing cost.

44. A audio/video (A/V) system comprising: downloadable applications for an A/V system, wherein each of the downloadable applications comprises a processing module and data for a graphical user interface (GUI) for presentation on the A/V system, wherein each downloadable application is configured to adjust a performance or a setting of the A/V equipment; an upgradable engine configured to interact with the processing modules for the downloadable applications, wherein the upgradable engine is configured to share processing resources in the A/V system for the processing modules, and wherein the upgradable engine is configured to manage downloaded applications and adjust the performance or the setting of the A/V equipment based on one or more factors.

45. The A/V system of enumerated example embodiment 44, further comprising a user account that comprises information for the A/V user, the A/V system, and the downloaded and downloadable applications, wherein the GUI is configured to manage the information for the user account with the A/V user and an application developer, wherein the A/V system is configured to send statistics to the application developer over an Internet connection regarding the upgradable engine, the downloaded applications, the A/V user, characteristics of the A/V system, or characteristics of the A/V user.

46. The A/V system of enumerated example embodiment 44, wherein the one or more factors comprise a type of A/V equipment, an input configuration of the A/V equipment, an output configuration of the A/V equipment, a specification of the A/V equipment, a level of quality of the A/V equipment, or a usage history of the A/V equipment.

47. The A/V system of enumerated example embodiment 44, wherein the one or more factors comprise an amount of processing power available for the A/V system, a number of applications for processing, a type of application for processing, or a type of application available for downloading.

48. The A/V system of enumerated example embodiment 44, wherein the one or more factors comprise a type of A/V content to be played on the A/V system, a user preference, or a user input.

49. The A/V system of enumerated example embodiment 44, wherein the one or more factors comprise an age of the A/V equipment or a level of degradation of performance of the A/V equipment over time.

50. The A/V system of enumerated example embodiment 49, wherein at least one of the applications is configured to correct for the level of degradation of performance of the A/V equipment.

51. The A/V system of enumerated example embodiment 44, further comprising a biometric profile of the A/V user, wherein the A/V system is configured to further adjust the performance or the setting of the A/V equipment based on the biometric profile of the A/V user, wherein the biometric profile of the A/V user comprises at least a hearing profile of the A/V user.

52. A method for audio and video (A/V) equipment, the method comprising: sending a processing module for at least one of a plurality of downloadable applications from an application developer over an Internet connection to A/V equipment for an A/V user, wherein each downloadable application comprises at least one processing module, and wherein each downloadable application is configured to interact with an upgradable engine to adjust a performance or a setting of the A/V equipment; sending statistics from the A/V equipment to the application developer over the Internet connection, the statistics comprising information for the upgradable engine, the downloaded applications, the A/V user, characteristics of the A/V equipment, or characteristics, habits, or demographics of the A/V user; forwarding at least some of those statistics from the application developer to a content provider or a manufacturer of the A/V equipment; and transmitting fee information between the application developer and the content provider or between the application developer and the manufacturer of the A/V equipment.

53. The method of enumerated example embodiment 52, further comprising processing the processing module with the upgradable engine, wherein the processing comprises sharing processing resources for two or more processing modules when the two or more processing modules are used to interact with the upgradable engine; and adjusting the performance of A/V equipment using the upgradable engine and the processing module.

54. The method of enumerated example embodiment 52, wherein sending the fee information comprises information for making arrangements for sending a fee from the application developer to the content provider.

55. The method of enumerated example embodiment 52, further comprising sending an advertisement that promotes the applications of the application developer to the A/V equipment for the A/V user, wherein the advertisement is configured for presentation on the A/V equipment.

56. The method of enumerated example embodiment 55, wherein when A/V content is purchased from the content provider by the A/V user, the advertisement is sent with A/V content from the content provider.

57. The method of enumerated example embodiment 52, wherein: sending the processing module comprises sending the processing module for at least one of the plurality of downloadable applications from a first computer associated with the application developer over the Internet connection to A/V equipment for the A/V user, sending the statistics comprises sending the statistics from the A/V equipment to the first computer associated with the application developer over the Internet connection, forwarding at least some of those statistics comprises forwarding at least some of those statistics from the first computer associated with the application developer to a second computer associated with the content provider or a third computer associated with the manufacturer of the A/V equipment, and transmitting the fee information comprises transmitting the fee information between the first computer associated with the application developer and the second computer associated with the content provider or between the first computer associated with the application developer and the third computer associated with the manufacturer of the A/V equipment.

58. The method of enumerated example embodiment 57, further comprising: forwarding information from the second computer associated with the content provider to the first computer associated with the application developer regarding a type of content, target audiences for A/V content, or market information; determining at least one processing module from the first computer associated with the application developer to send to the A/V equipment for the A/V user based on the information from the second computer associated with the content provider; and sending the at least one processing module over the Internet connection from the first computer associated with the application developer to the A/V equipment of the A/V user based on the information from the second computer associated with the content provider.

59. The method of enumerated example embodiment 58, wherein the content provider associates the A/V content with an advertisement for the downloadable applications and promotes the downloadable applications to the A/V user along with the A/V content that the content provider provides or develops for the A/V user.

60. The method of enumerated example embodiment 57, further comprising sending the fee information from the first computer associated with the application developer to the third computer associated with the manufacturer of the A/V equipment, wherein sending the fee information comprises information for making arrangements for sending a fee from the application developer to the manufacturer of the A/V equipment.

61. The method of enumerated example embodiment 57, further comprising: forwarding information from the third computer associated with the manufacturer of the A/V equipment to the first computer associated with the application developer, the forwarded information comprising data, specification, and statistical information for the A/V equipment; determining at least one processing module from the application developer to send to the A/V equipment for the A/V user based on the information from the manufacturer of the A/V equipment; and sending the at least one processing module over the Internet connection from the first computer associated with the application developer to the A/V equipment for A/V user based on the information from the third computer associated with the manufacturer of the A/V equipment.

62. The method of enumerated example embodiment 57, further comprising sending additional statistics related to the A/V user to the first computer associated with the application developer over the Internet connection, the statistics comprising user biometric information, user ratings, a user profile, a viewing or listening schedule of the A/V user, or a usage of downloaded applications.

63. The method of enumerated example embodiment 62, further comprising sending A/V content from the second computer associated with the content provider to the A/V equipment for the A/V user.

The techniques and systems described herein can be combined with and/or tied to other multimedia applications, such as graphics, text, and related data, as well as biometric and environmental data. One or more embodiments of the various types of formulations presented in this disclosure can take into account various display, processing, audio playback, and/or distortion characteristics. In some aspects, the type and order of processing can be partially or wholly decided based on any combination of system complexity, channels, and distortion metrics. Various embodiments herein can apply to H.264, AVC, and any other video and image coding methods, and related audio. The concepts herein can also be extended to and applied in multi-dimensional video, such as 3-D video. Particular embodiments of the disclosure have been described, other embodiments are within the scope of the following claims.

The invention claimed is:

1. A method executed by one or more processors, the method comprising:
    accessing a plurality of processing modules for a plurality of downloadable applications,
        wherein each downloadable application comprises at least one processing module and data for a graphical user interface, and
        wherein each processing module is configured to interact with an upgradable engine to adjust at least one of a performance or a setting of audio/video (AV) equipment; and
    arranging an order of processing modules within at least two processing chains, wherein the arranging for each processing chain comprises,
        determining, by the one or more processors, an order of two or more of the processing modules in a processing chain based on available system resources of the one or more processors, and
        arranging, by the one or more processors, the two or more processing modules in the processing chain based on the determined order;
    forming a hierarchy of processing levels for the at least two processing chains based upon at least one of a number of processing modules in the processing chain or one or more types of processing modules in the processing chains;
    dynamically arranging a processing order in the hierarchy in response to changes in the configuration of the AV equipment; and
    processing audio-related data with the upgradable engine and the processing chain.

2. The method of claim 1, wherein said arranging comprises rearranging a previously determined processing order of the processing modules in the processing chain.

3. The method of claim 1, wherein determining, by the one or more processors, an order of two or more of the processing modules in a processing chain based on available system resources of the one or more processors comprises determining, by the one or more processors, an order of two or more of the processing modules in a processing chain based on: (i) available system resources of the one or more processors; and (ii) metadata that relates to a level of performance of the AV equipment.

4. The method of claim 1, wherein the order of the processing modules in the processing chain comprises an order in which the processing modules are processed with the upgradable engine.

5. The method of claim 1, wherein the order of the processing modules in the processing chain is dynamically adjustable.

6. The method of claim 1, wherein determining, by the one or more processors, an order of two or more of the processing modules in a processing chain based on available system resources of the one or more processors comprises determining, by the one or more processors, an order of two or more of the processing modules in a processing chain based on: (i) available system resources of the one or more processors; and (ii) at least one of a type of the AV equipment, an age of the AV equipment, a specification of a performance of the AV equipment, a condition of the AV equipment, an input configuration of the AV equipment, an output configuration of the AV equipment.

7. The method of claim 1, wherein determining, by the one or more processors, an order of two or more of the processing modules in a processing chain based on available system resources of the one or more processors comprises determining, by the one or more processors, an order of two or more of the processing modules in a processing chain based on: (i) available system resources of the one or more processors; and (ii) a number of processing modules to process or a type of processing modules to process.

8. The method of claim 1, wherein determining, by the one or more processors, an order of two or more of the processing modules in a processing chain based on available system resources of the one or more processors comprises determining, by the one or more processors, an order of two or more of the processing modules in a processing chain based on: (i) available system resources of the one or more processors; and (ii) at least one of a level of a quality of the AV equipment, or a type of content to be played by the AV equipment.

9. The method of claim 1, wherein the arranging of the order of the two or more of the processing modules further depends on information from a user profile.

10. The method of claim 1, wherein determining, by the one or more processors, an order of two or more of the processing modules in a processing chain based on available system resources of the one or more processors comprises determining, by the one or more processors, an order of two or more of the processing modules in a processing chain based on: (i) available system resources of the one or more processors; and (ii) a usage history of the AV equipment.

11. The method of claim 1, wherein said arranging comprises rearranging a previously determined processing order of the processing modules, and wherein the previously determined processing order is an order that is downloaded from an application developer.

12. The method of claim 1, further comprising:
    arranging an order of two or more processing chains, where each processing chain comprises at least two processing modules;
    wherein the arranging the order of two or more of the processing chains comprises:
    assigning each of the processing chains to a level of a hierarchy;
    for each level of the hierarchy, evaluating a processing cost or a processing resource requirement to determine whether at least one of the processing cost or the processing resource requirement is lower based upon having at least one of the processing modules in the respective level of the hierarchy to be rearranged into another order in the processing chain of the hierarchy; and
    based upon determining that at least one of the processing cost or the processing resource requirement is lower, rearranging the order of the at least one processing module in the processing chain for the respective hierarchy to position the at least one processing module in the order that produces the lower processing cost or the lower processing resource requirement.

13. The method of claim 1, wherein the hierarchy is formed to arrange a processing order in the hierarchy according to a configuration of the AV equipment.

14. The method of claim 1, wherein the dynamic arranging of the processing order in the hierarchy comprises re-arranging the order of at least two of the processing modules in the hierarchy to perform the processing operations involving at least one of sharing the processing resources, reducing the computation requirement of the AV equipment, and increasing the level of performance of the AV equipment.

15. The method of claim 1, further comprising arranging the processing order in the hierarchy based upon a type of AV equipment and stored user preferences for the AV equipment.

16. A system for audio and video processing, the system comprising:
    a graphical user interface;
    a processor;
    an upgradable engine configured to interact with the processor; and
    a plurality of processing modules for a plurality of downloadable applications,
    wherein each downloadable application comprises at least one processing module and data for a graphical user interface, and
    wherein each processing module is configured to interact with an upgradable engine to adjust at least one of a performance or a setting of audio/video (AV) equipment;
    the processor being configured to perform operations comprising:
    arranging an order of processing modules within at least two processing chains, wherein the arranging for each processing chain comprises,
        determining an order of two or more of the processing modules in a processing chain based on available system resources of the one or more processors, and
        arranging the two or more processing modules in the processing chain based on the determined order;
    forming a hierarchy of processing levels for the at least two processing chains based upon at least one of a number of processing modules in the processing chain or one or more types of processing modules in the processing chains;
    dynamically arranging a processing order in the hierarchy in response to changes in the configuration of the AV equipment; and
    processing audio-related data with the upgradable engine and the processing chain.

17. A non-transitory computer-readable storage medium comprising instructions that when executed by at least one processor cause the at least one processor to perform operations comprising
    accessing a plurality of processing modules for a plurality of downloadable applications,
        wherein each downloadable application comprises at least one processing module and data for a graphical user interface, and
        wherein each processing module is configured to interact with an upgradable engine to adjust at least one of a performance or a setting of audio/video (AV) equipment; and
    arranging an order of processing modules within at least two processing chains, wherein the arranging for each processing chain comprises,
        determining an order of two or more of the processing modules in a processing chain based on available system resources of the one or more processors, and
        arranging the two or more processing modules in the processing chain based on the determined order;
    forming a hierarchy of processing levels for the at least two processing chains based upon at least one of a number of processing modules in the processing chain or one or more types of processing modules in the processing chains;
    dynamically arranging a processing order in the hierarchy in response to changes in the configuration of the AV equipment; and
    processing audio-related data with the upgradable engine and the processing chain.

18. A system comprising:
    at least one computer; and
    at least one storage medium coupled to the at least one computer having instructions stored thereon which, when executed by the at least one computer, causes the at least one computer to perform operations comprising:
    accessing a plurality of processing modules for a plurality of downloadable applications, wherein each downloadable application comprises at least one processing module and data for a graphical user interface, and wherein each processing module is configured to interact with an upgradable engine to adjust at least one of a performance or a setting of audio/video (AV) equipment; and arranging an order of processing modules within at least two processing chains, wherein the arranging for each processing chain comprises, determining an order of two or more of the processing modules in a processing chain based on available system resources of the one or more processors, and arranging the two or more processing modules in the processing chain based on the determined order;

forming a hierarchy of processing levels for the at least two processing chains based upon at least one of a number of processing modules in the processing chain or one or more types of processing modules in the processing chains;

dynamically arranging a processing order in the hierarchy in response to changes in the configuration of the AV equipment; and processing audio-related data with the upgradable engine and the processing chain.

19. The method of claim 1, wherein the one or more processors are remote from the AV equipment.

20. The system of claim 16, wherein the processor is remote from the AV equipment.

* * * * *